United States Patent
Mikuni

(10) Patent No.: US 9,721,388 B2
(45) Date of Patent: Aug. 1, 2017

(54) INDIVIDUAL IDENTIFICATION CHARACTER DISPLAY SYSTEM, TERMINAL DEVICE, INDIVIDUAL IDENTIFICATION CHARACTER DISPLAY METHOD, AND COMPUTER PROGRAM

(75) Inventor: Shin Mikuni, Kawasaki (JP)

(73) Assignee: NEC Corporation, Tokyo (JP)

(*) Notice: Subject to any disclaimer, the term of this patent is extended or adjusted under 35 U.S.C. 154(b) by 12 days.

(21) Appl. No.: 14/112,030

(22) PCT Filed: Apr. 11, 2012

(86) PCT No.: PCT/JP2012/059911
§ 371 (c)(1),
(2), (4) Date: Oct. 15, 2013

(87) PCT Pub. No.: WO2012/144389
PCT Pub. Date: Oct. 26, 2012

(65) Prior Publication Data
US 2014/0035952 A1 Feb. 6, 2014

(30) Foreign Application Priority Data
Apr. 20, 2011 (JP) ................................. 2011-093810

(51) Int. Cl.
G09G 5/00 (2006.01)
G06T 19/00 (2011.01)
(Continued)

(52) U.S. Cl.
CPC .......... *G06T 19/006* (2013.01); *G06F 3/1423* (2013.01); *H04N 21/41407* (2013.01);
(Continued)

(58) Field of Classification Search
CPC combination set(s) only.
See application file for complete search history.

(56) References Cited

U.S. PATENT DOCUMENTS

2002/0015514 A1    2/2002  Kinjo et al.
2006/0182433 A1*   8/2006  Kawahara et al. ........... 396/123
(Continued)

FOREIGN PATENT DOCUMENTS

JP    2002077592 A    3/2002
JP    3729161 B       12/2005
(Continued)

OTHER PUBLICATIONS

International Search Report corresponding to International Application No. PCT/JP2012/059911, dated May 22, 2012, 2 pages.
(Continued)

*Primary Examiner* — M Good Johnson
(74) *Attorney, Agent, or Firm* — Wilmer Cutler Pickering Hale and Dorr LLP

(57) ABSTRACT

A terminal device retains a character image of an own terminal user and a character image of a second terminal user acquired from an AR database server (or second terminal devices) as a character definition in an AR control unit. The terminal device can acquire the position of the second terminal device and a direction in which a camera unit is oriented. The terminal device of a photographer determines whether the user of the second terminal device which is being searched for is present in the acquired direction by causing image recognition unit to identify a face image of a specific user of the second terminal device. When the specific user of the second terminal device is present, the character image of the specific user of the second terminal device is combined in the vicinity of a face image region of the image obtained by the camera unit and is displayed.

10 Claims, 18 Drawing Sheets

(51) Int. Cl.
*H04N 21/414* (2011.01)
*H04N 21/422* (2011.01)
*H04N 21/4223* (2011.01)
*H04N 21/44* (2011.01)
*H04N 21/4788* (2011.01)
*G06F 3/14* (2006.01)
*G01S 19/45* (2010.01)

(52) U.S. Cl.
CPC ... *H04N 21/4223* (2013.01); *H04N 21/42202* (2013.01); *H04N 21/44008* (2013.01); *H04N 21/4788* (2013.01); *G01S 19/45* (2013.01); *G09G 2370/16* (2013.01); *H04M 2250/12* (2013.01); *H04M 2250/52* (2013.01)

(56) References Cited

U.S. PATENT DOCUMENTS

| | | | | |
|---|---|---|---|---|
| 2009/0061901 | A1* | 3/2009 | Arrasvuori | G06Q 30/00 455/456.3 |
| 2009/0256925 | A1* | 10/2009 | Yoshizumi | 348/222.1 |
| 2009/0285483 | A1* | 11/2009 | Guven | G06Q 30/016 382/181 |
| 2010/0061294 | A1* | 3/2010 | Proctor et al. | 370/328 |
| 2012/0026191 | A1* | 2/2012 | Aronsson et al. | 345/633 |
| 2012/0250950 | A1* | 10/2012 | Papakipos et al. | 382/118 |
| 2013/0329059 | A1* | 12/2013 | Uchikoshi et al. | 348/207.1 |

FOREIGN PATENT DOCUMENTS

| | | |
|---|---|---|
| JP | 4032776 B | 1/2008 |
| JP | 2008-510254 A | 4/2008 |
| JP | 2009-076060 A | 4/2009 |
| JP | 2010049690 A | 3/2010 |
| JP | 2011-521489 A | 7/2011 |
| JP | 2012060240 A | 3/2012 |
| WO | WO-2006023268 A2 | 3/2006 |
| WO | WO-2010/084242 A1 | 7/2010 |

OTHER PUBLICATIONS

Kato, et al. "An Augmented Reality System and its Calibration based on Marker Tracking", TVRSJ, vol. 4, No. 4, 1999, 19 pages.
Extended European Search Report issued by the European Patent Office for European Application No. 12774800.2 mailed on Nov. 13, 2014 (6 pages).
Dillow, Clay, "Augmented Identity App Helps You Identify Strangers on the Street," Popular Science, retrieved from the internet: [<URL:http://www.popsci.com/technology/article/2010-02/augmented-identity-app-helps-you-identify-friend-perfect-strangers>], 3 pages (retrieved on Nov. 6, 2014).
Ferreira, Vasco, "Polar Rose—Recognizer," retrieved from the internet: [<URL:http://www.youtube.com/watch?v=OQBLKBYrgvk>], 1 page (retrieved on Nov. 6, 2014).
Kemp, et al., "Opportunistic Communication for Multiplayer Mobile Gaming: Lessons Learned from PhotoShoot," Proceedings of the Second International Workshop on Mobile Opportunistic Networking, MOBIOPP '10, 3 pages (Feb. 22, 2010).
TAT, "TAT augmented ID," retrieved from the internet: [<URL:https://www.youtube.com/watch?v=tbOpMEg1UN0>], 1 page (retrieved on Nov. 6, 2014).
Japanese Office Action corresponding to Japanese Application No. 2013-510960, dated Dec. 15, 2015, 5 pages.

* cited by examiner

FIG. 16

| |
|---|
| TERMINAL ID (16 BYTES) |
| NAME DATA LENGTH (4 BYTES) |
| NAME DATA (VARIABLE LENGTH) |
| GROUP ID DATA LENGTH (4 BYTES) |
| GROUP ID DATA (VARIABLE LENGTH) |
| FACE KEY (16 BYTES) |
| DEFINITION DATA LENGTH (4 BYTES) |
| CHARACTER DEFINITION (VARIABLE LENGTH) |
| TERMINAL POSITION (16 BYTES) |

INDIVIDUAL IDENTIFICATION CHARACTER DISPLAY SYSTEM, TERMINAL DEVICE, INDIVIDUAL IDENTIFICATION CHARACTER DISPLAY METHOD, AND COMPUTER PROGRAM

CROSS-REFERENCE TO RELATED APPLICATIONS

This application is a national stage application of International. Application No. PCT/JP2012/059911 entitled "Individual Identification Character Display System, Terminal Device, Individual Identification Character Display Method, and Computer Program," filed on Apr. 11, 2012, which claims the benefit of the priority of Japanese patent application No. 2011-093810, filed on Apr. 20, 2011, the disclosures of each of which are hereby incorporated by reference in their entirety.

TECHNICAL FIELD

The present invention relates to an individual identification character display system, a terminal device, an individual identification character display method, and a computer program, and more particularly, to an individual identification character display system, a terminal device, an individual identification character display method, and a computer program capable of identifying a specific individual based on imaging data obtained by taking a photograph and displaying an individual identification character used to view the photographed individual as well in the vicinity of a captured image obtained by photographing the specific individual.

BACKGROUND ART

In recent years, technologies for combining a computer graphic (CG)-drawn image with a captured image of the real world photographed with a camera or the like by a photographer using CG and displaying the combined image on a display device have been developed. In particular, technologies, which combine photographed individual imaging data of the real world with CG image data registered (set) and designated in advance, have been popularized.

As known technology information in this field, for example, there is a technology disclosed in Non-patent Document 1.

Non-patent Document 1 describes a method of combining a virtual object with a video of the real world by measuring the 3-dimensional position and the posture of an object using markers disposed at apexes of a parallelogram.

Patent Document 1 manifests a mixed reality display device and method, a storage medium, and a computer program. Specifically, a CG image can be combined with an image photographed with a camera, and is displayed by installing a design-drawn marker or a blinking LED light source at a specific place of the real world. Thus, for example, a simulation of a scene in which a piece of furniture installed in a specific place in the real world can be viewed on a display device. This demonstrates an application of the mixed reality display method as a disposition simulation in a real world space of furniture or an electronic appliance.

Patent Document 2 shows a portable augmented reality device and method and describes an embodiment in which the above-described display system is applied to a portable game device.

Patent Document 3 shows an entertainment device, system, and method and discloses an embodiment in which a die-shaped object is used as the above-described proper object.

Patent Document 4 describes a target position search device, a target position search method, and a program. This patent document is an earlier filed patent application technology and describes a search display system of an individual, a target facility, or the like by AR (Augmented Reality).

Specifically, a graphic indicating the position of a target object is combined with a real video and is displayed based on a display method using a simple graphic without execution of discrimination by a search target.

DOCUMENTS OF THE PRIOR ART

Patent Documents

Patent Document 1
  Japanese Patent No. 4032776
Patent Document 2
  Published Japanese Translation No. 2008-510254 of the PCT International Publication
Patent Document 3
  Japanese Unexamined Patent Application, First Publication No. 2010-049690
Patent Document 4
  Japanese Patent No. 3729161

Non-Patent Document

Non-Patent Document 1
  Article "Augmented Reality System and its Calibration based on Mark Tracking" by Hirokazu Kato, Mark Billinghurst, Koichi Asano, Keihachiro Tachibana (Virtual Reality Society of Japan, Vol. 4, No. 4, 1999)

DISCLOSURE OF INVENTION

Problems to be solved the invention

In the individual identification character display systems described in the background art, for example, there are the following problems with the technologies disclosed in Patent Documents 1 to 4 described above.

In the technology disclosed in Patent Document 1 described above, it is necessary to install a proper object at a position at which an image is disposed.

That is, the technology requires to prepare a special object (marker object) as a marker that designates a place where an image is combined. Since numerous kinds of marker objects are necessary in order to control many kinds of combined CG images, the kinds of CG images displayable by the prepared markers are very restricted.

In the technologies disclosed in Patent Documents 2 and 3, as in the technology disclosed in Patent Document 1, it is necessary to prepare a special object as a marker used to designate a place where images are combined. Further, numerous kinds of corresponding marker objects are necessary in order to control many kinds of combined CG images. For this reason, the kinds of CG images displayable by the prepared marks (markers corresponding to the marker objects) are inevitably very restricted. The technologies mentioned above are different from the present invention.

Thus, it is difficult to prepare numerous images markers customized by individuals and share data between terminal devices.

In the technology disclosed in Patent Document 4 described above, a distance and a direction of an individual located far away in a landscape can be displayed by an AR combining technology. However, since an image to be synthesized by the AR combining technology is fixed for any partner, presentation is deficient.

Further, in the technology disclosed in Patent Document 4, a searching individual should be specified in advance and displayed. Thus, since an image used in the combining may not be customized as image data indicating a specific individual, the technology may not be used for the purpose of becoming aware of a companion present in a landscape or specifying an individual after becoming aware that the companion is present so that a photographer can search at an origin of the individual.

The present invention is devised in view of the above-mentioned problems of the related art and an object of the present invention is to provide an individual identification character display system capable of identifying a specific individual from a captured image photographed by a photographer using an image recognition technology and displaying an individual identification character used to view the individual as well in the vicinity of the captured image of the specific individual.

Means for Solving the Problem

In order to achieve the aforementioned objects, according to an aspect of the present invention, there is provided an individual identification character display system that combines a CG-drawn image with an image of the real world photographed by a camera mounted on a terminal device. The individual identification character display system includes: a detection unit that recognizes and detects, from image data of the real world photographed by the camera, a partial region having a feature of a predetermined subject in an image region displaying the image data by a pattern matching method; a drawing combination unit that combines a predetermined CG image retained in advance corresponding to the subject featured in the partial region with the detected partial region of the image of the real world; and an image display unit that displays the image of the real world including the combined image region.

According to another aspect of the present invention, there is provided a terminal device that combines a CG-drawn image with an image of the real world photographed by a camera mounted on the terminal device. The terminal device includes: a detection unit that recognizes and detects, from image data of the real world photographed by the camera, a partial region having a feature of a predetermined subject in an image region displaying the image data by a pattern matching method; a drawing combination unit that combines a predetermined CG image retained in advance according to the subject featured in the partial region with the detected partial region of the image of the real world; and an image display unit that displays the image of the real world including the combined image region.

According to still another aspect of the present invention, there is provided an individual identification character display method of combining a CG-drawn image with an image of the real world photographed by a camera mounted on a terminal device. The individual identification character display method includes: recognizing and detecting, from image data of the real world photographed by the camera, a partial region having a feature of a predetermined subject in an image region displaying the image data by a pattern matching method; combining a predetermined CG image retained in advance according to the subject featured in the partial region with the detected partial region of the image of the real world; and displaying the image of the real world including the combined image region.

According to further still another aspect of the present invention, there is provided a computer program controlling a terminal device that combines a CG-drawn image with an image of the real world photographed by a mounted camera. The computer program includes: recognizing and detecting, from image data of the real world photographed by the camera, a partial region having a feature of a predetermined subject in an image region displaying the image data by a pattern matching method; combining a predetermined CG image retained in advance according to the subject featured in the partial region with the detected partial region of the image of the real world; and displaying the image of the real world including the combined image region.

Effects of the Invention

As described above, the individual identification character display system of the present invention can detect a specific individual and can combine and draw an AR character customized for each individual using a face part of the individual as a marker. Therefore, for example, it is possible to provide an image in which a work of animation including characters such as a main character and secondary characters to the main character is fused with the real world and presented.

BRIEF DESCRIPTION OF THE DRAWINGS

FIG. 16 is a data structure diagram illustrating the structure of an individual record data as one example in the individual identification character display system of the second embodiment of the present invention.

EMBODIMENTS FOR CARRYING OUT THE INVENTION

Figure 1:
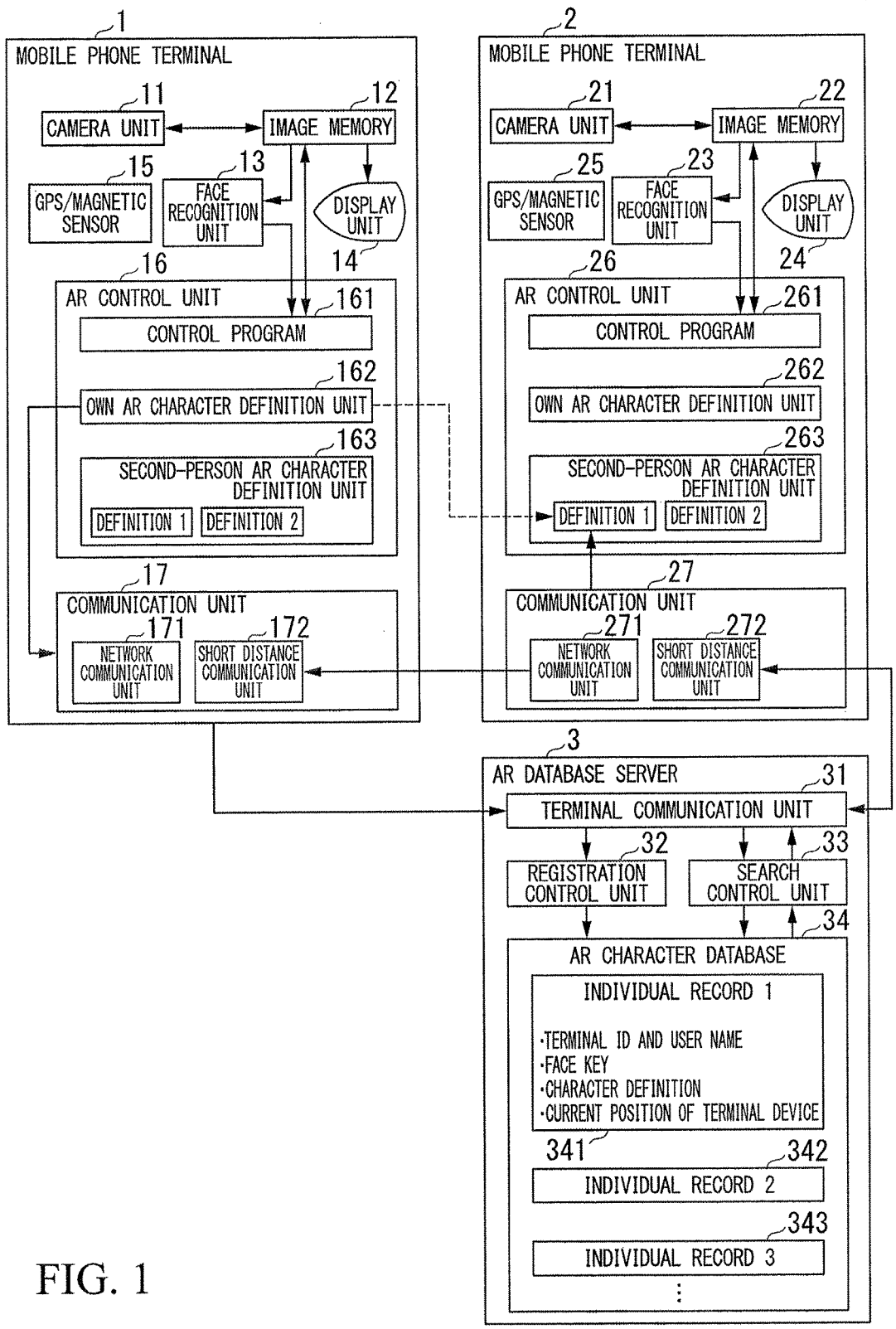
FIG. 1 is a diagram illustrating an overall constitution of an individual identification character display system of a first embodiment of the present invention.

In an embodiment of the present invention, an image recognition unit that extracts a feature of an image of an individual face recognizes a specific individual and displays an image (AR character) to be synthesized so as to be strongly associated with the individual as well in a neighboring image of the individual.

Thus, numerous AR characters customized for each individual can be controlled. For example, it is possible to perform a service of providing an image in which a work of animation having secondary characters to a main character and a person photographed in the real world are fused and presented. Further, it is possible to perform an operation of enumerating and displaying graphics obtained by customizing users present in the scene displayed directly ahead and designating a specific individual among the users.

In the individual identification character display system according to this embodiment of the present invention:

(1) a plurality of terminal devices (for example, mobile phone terminal devices) each include a camera unit, a positioning unit, and an azimuth measurement unit in a constitution in which the plurality of terminal devices are connected to a database server via a network;

(2) at least the terminal device of a photographer can retain character images of terminal users and character images of the second terminal users acquired from the database server (or second terminals) in character definition units; and (3) at least the terminal device of the photographer can acquire an image displayed directly ahead of the photographer from the camera unit and display the image, and can acquire the position of the terminal device of the photographer.

Further, in the individual identification character display system of the embodiment of the present invention:

(4) at least the terminal device of the photographer can acquire the direction in which the camera unit is oriented; and (5) at least the terminal device of the photographer determines whether the user of a second terminal device which is being searched for is present in the acquired direction by causing an image recognition unit to identify a face image of a specific user of the second terminal device different from the terminal device of the photographer. When the specific user of the second terminal device is present, the distance up to the second terminal device is displayed, and the character image of the specific user of the second terminal device is combined with an image obtained by the camera unit and is displayed. More specifically, the combined character image is configured to be selected based on feature information extracted from the face of the specific user of the second terminal device using the image recognition unit.

That is, in the embodiment of the present invention, the individual identification character display system is a system that can identify the specific individual in the photographed imaging data and can display a character (that is, AR (Augmented Reality) in which a specific individual is customized) strongly associated with the specific individual in the vicinity of the captured image of the specific individual. To specify an individual, for example, a face recognition function is used, a recognized face part is used as a marker for designating an image combining place, and the AR character associated with the individual is drawn.

Usually, a mobile terminal device of a photographer owned by an individual taking a photograph serves as an AR data server to deliver AR character data.

When the mobile terminal device of a second user (a second registered individual member) is close to the terminal device of the photographer (in a range in which wireless short distance communication means or the like is usable), the mobile terminal device of the second user directly operates as the AR data server through the wireless short distance communication means or the like.

When the mobile terminal device of the second user is not close to the terminal device of the photographer (in a range in which the wireless short distance communication means or the like is unusable), a server acquiring data from the mobile terminal device through communication with a central server directly delivers the data through network communication or is connected to the mobile terminal device via a relay and indirectly delivers the data.

When the terminal device of the photographer is not close to the second mobile terminal device of the second user but second users are present nearby, a rough position of the second user can be indicated or the fact that a plurality of second users are present can be indicated. Therefore, a second individual can be designated by designating the indicated character.

The AR character data of the photographer retained in the mobile terminal devices owned by the photographed registered individual members can be configured to be specially referred to when an individual photographer takes a photograph of his or her own face. However, the AR character data is generally referred to by the mobile terminal devices of the second registered individual members different from the photographed registered members.

Thus, users of the registered members can be provided with a service of displaying an image in which a work of animation and reality are fused by setting characters such as a fairy flying near a specific animation character and a small animal in an AR environment as the AR character data in the device of the photographer.

Further, it is also possible to provide a system in which a photographer can arrive at a place in which a subject that is a user is present by designating the above-described fairy or small animal taken by a camera.

Hereinafter, an individual identification character display system, a terminal device, and a computer program of the present invention will be described in detail with reference to the drawings in order of first and second embodiments.

In the description of each embodiment, an individual identification character display system, an individual identification character display method, and a terminal device of the present invention will be described in detail. However, since a computer program of the present invention is a program causing the terminal device to operate, the description of the computer program is included in the following description.

[First Embodiment]

FIG. 1 is a diagram illustrating an overall constitution of an individual identification character display system of a first embodiment of the present invention.

The individual identification character display system of this embodiment illustrated in FIG. 1 includes mobile phone terminals 1 and 2 (both of which are terminal devices of embodiments of the present invention), which are mobile phone terminal devices, and an AR database server 3.

Here, the individual identification character display system of the present invention can generally be configured to include two or more terminal devices and a database server device. The mobile phone terminal devices 1 and 2 are included as terminal devices of the embodiment of the present invention, but the constitution of the terminal devices is not limited to the above-described constitution. Accordingly, the number of terminal devices may be any plural number.

The terminal devices of the embodiment of the present invention are not limited to mobile phone terminal devices or smartphones, but other devices such as game devices, tablet PCs, or note-type PCs may be used.

In the following description, for example, the mobile phone terminal device 1 (terminal device 1) and the mobile phone terminal device 2 (terminal device 2) are assumed to have the same constitution, but the plurality of terminal devices of the embodiment of the present invention may have different constitutions, as long as the functions of the mobile phone terminal devices 1 and 2 are the same.

The mobile phone terminal device 1 includes a camera unit 11, an image memory unit 12, a face recognition unit 13, a display unit 14 including a touch panel, a GPS/magnetic sensor 15, an AR control unit 16, and a communication unit 17.

The AR control unit 16 includes a control program 161, an own AR character definition 162, and a second-person AR character definition 163.

The communication unit 17 includes a network communication unit 171 and a short distance communication unit 172.

The mobile phone terminal device 2 includes a camera unit 21, an image memory unit 22, a face recognition unit 23, a display unit 24 including a touch panel, a GPS/magnetic sensor 25, an AR control unit 26, and a communication unit 27.

The AR control unit 26 of the mobile phone terminal 2 includes a control program 261, an own AR character definition 262, and a second-person AR character definition 263.

The communication unit 27 includes a network communication unit 271 and a short distance communication unit 272.

The AR database server 3 includes a terminal communication unit 31, a registration control unit 32, a search control unit 33, and an AR character database 34.

The AR character database 34 includes an individual record 1 (341), an individual record 2 (342), an individual record 3 (343), . . . , and an individual record n (34n) (where n is the number of registered records).

Figure 2:
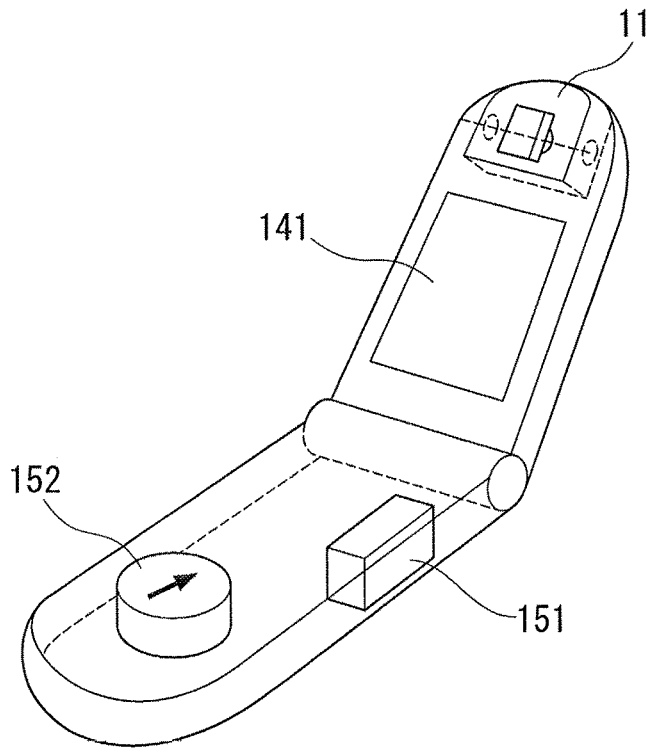
FIG. 2 is a diagram illustrating the constitution of an outer appearance of a mobile phone terminal of the individual identification character display system of the first embodiment of the present invention.

FIG. 2 is a diagram illustrating the constitution of the outer appearance of the mobile phone terminals 1 and 2 of the individual identification character display system of the first embodiment of the present invention.

FIG. 2 illustrates a part of the camera unit 11, a display screen 141 which is a constituent element of the display unit 14, and a GPS 151 and a magnetic sensor 152 which are constituent elements of the GPS/magnetic sensor unit 16.

Hereinafter, functions of the individual identification character display system of this embodiment will be described with reference to FIGS. 1 and 2.

In the following description, functions of the mobile phone terminal 1 will be described as well. Functions of the mobile phone terminal 2 are the same as the functions of the mobile phone terminal 1, and thus are assumed to be included in the following description.

An image photographed by the camera unit 11 is retained in the image memory 12.

The face recognition unit 13 is connected to the image memory 12. The face recognition unit 13 includes means for cutting out a face part of a person in the image photographed by the camera unit 11 and acquiring the size and position of the face part and means for digitizing features of the cut face.

The image memory 12 can be accessed even from the AR control unit 16. By drawing a graphic here, the graphic can be combined and drawn in a real scene to be displayed.

When the graphic is drawn, the control program 161 scales the graphic associated with a feature numerical value of the face of the size of the cut face region and displays the scaled graphic near the face region.

By changing a relative position using a time as a key, an animation effect such as flying of the graphic the upper vicinity of the detected face region can be realized.

Since a character definition unit (the own AR character definition 162 and the second-person AR character definition 163 in the mobile phone terminal 1) of the AR control unit 16 is provided, the control program 161 draws the graphic on the image memory 12 with reference to data defined in the character definition.

The character definition is a definition for a user of the mobile phone terminal 1 who is a user registered in this system and includes one (here, the own AR character definition 162 of the mobile phone terminal 1) own AR character definition of a user of the mobile phone terminal 1 displayed in the terminal device (for example, the mobile phone terminal 2) of a second user registered in this system and one (here, the second-person AR character definition 163) AR character definition in which one or more AR characters (displayed with the mobile phone terminal 1) of the other users registered in this system are defined.

The AR control unit 16 further includes means for storing a plurality of second-person AR character definitions to be displayed with the mobile phone terminal 1.

Definition data of the own AR character definition 162 of the mobile phone terminal 1 can be referred to by the communication unit 17, and thus the data can be exchanged between terminal devices (for example, the mobile phone terminals 1 and 2) through short distance communication performed by the short distance communication unit 172 (wireless communication unit) included in the communication unit 17, or the definition data can be likewise uploaded to the AR database server 3 installed in a network by the network communication unit 171 included in the communication unit 17.

As a reverse process to the above process, the communication unit 17 can download the definition data of the mobile phone terminal 2 uploaded to the AR database server 3 to the second-person AR character definition unit 163 of the mobile phone terminal 1 via the short distance communication unit 172 and/or the network communication unit 171.

The GPS/magnetic sensor 15 of the mobile phone terminal 1 is mounted as a terminal position positioning unit by GPS and an azimuth measurement unit by a magnetic sensor. A positioning result can be referred to from the control program 161 of the AR control unit 16.

The AR database server 3 includes the terminal communication unit 31 as communication means for communicating with the mobile phone terminal 1 and includes the AR character database 34 as means for storing the character definition data transmitted from the mobile phone terminal 1 via the terminal communication unit 31.

The AR database server 3 includes the search control unit 33 as means for receiving a request to retrieve data stored in the AR database server 3 from the mobile phone terminal 1.

The search control unit 33 includes means for causing the terminal communication unit 31 to transmit a search result to the mobile phone terminal 1 via a network.

The AR database server 3 further includes the registration control unit 32 as means for registering an AR character including at least one record per person in the AR character database 34.

As illustrated in FIG. 1, data corresponding to one record stored by the AR character database 34 includes a terminal ID and a user name used to identify the terminal device, a face key which is a feature value calculated when face recognition of the owner of the terminal device 1 is performed, a character definition which is graphic information customized for each individual, and the current position of the terminal device measured by a GPS or the like.

The current position of the terminal device is data that is acquired when a current position acquisition request exchanged between a plurality of terminal devices of a plurality of registered users is relayed by the AR character database 34.

As will be described below in a second embodiment, a method of storing the data may be configured such that only information regarding the terminal ID and the user name and the current position of the terminal is retained and information regarding the face key and the character definition is delivered by a terminal device itself in which the data is stored by redirecting an information acquisition request to a terminal device in which the data is to be stored.

Figure 3:
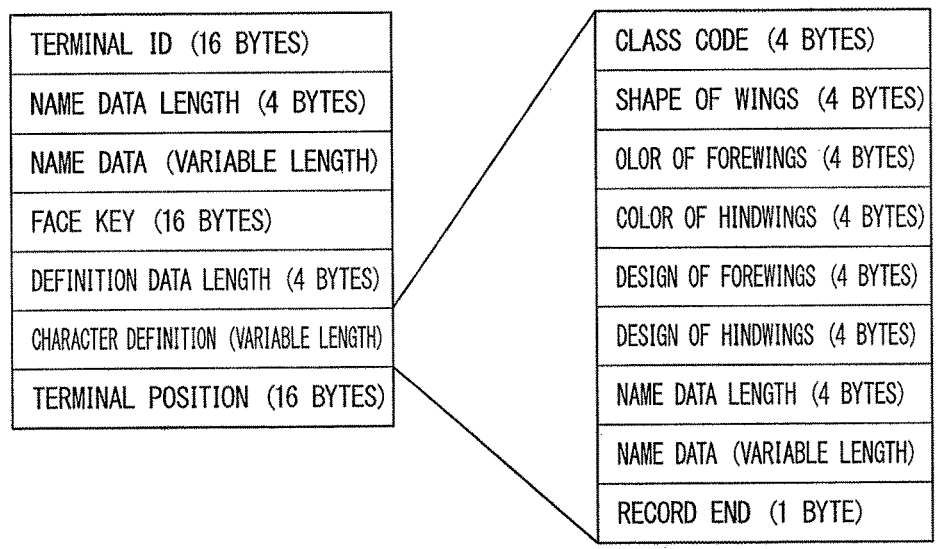
FIG. 3 is a data structure diagram illustrating the details of a data structure of an individual record stored in an AR character database illustrated in FIG. 1.

FIG. 3 is a diagram illustrating a data structure which indicates the details of a data structure of the individual record stored by the AR character database 34 as one example. FIG. 3 shows an exemplary example of an overall structure of the individual record and a detailed structure of the character definition of the individual record.

Data of the individual record stored by the AR character database 34 exemplified in FIG. 3 includes a terminal ID, such as a telephone number of a terminal device or a communication MAC address, used to identify the terminal device, user name data associated with the terminal ID, a face key, character definition data, and data of the current position of the terminal.

The character definition of the individual record exemplified in FIG. 3 includes a class of a character, shapes and colors or design of parts, and a name of the character. With regard to the class or the design of the character, codes illustrated in FIGS. 4A to 4D are defined. Thus, a user of this system can define unique characters by freely combining the class and the design.

FIGS. 4A to 4D are diagrams illustrating corresponding examples between AR character definitions and images.

Figure 4A:
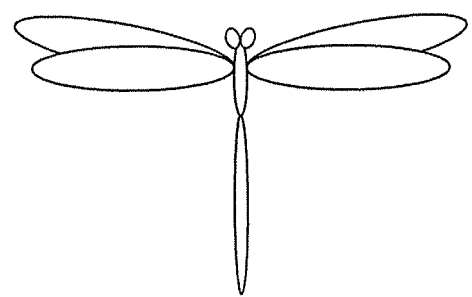
FIG. 4A is a diagram illustrating a corresponding example of an AR character definition and an image.
Figure 4B:
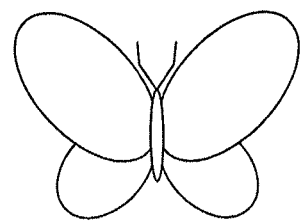
FIG. 4B is a diagram illustrating a corresponding example of an AR character definition and an image.

FIG. 4A illustrates a case in which a class code is 1 (dragonfly) and FIG. 4B illustrates a case in which a class code is 2 (butterfly).

Figure 4C:
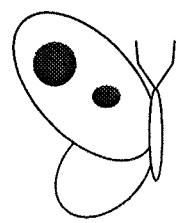
FIG. 4C is a diagram illustrating a corresponding example of an AR character definition and an image.
Figure 4D:
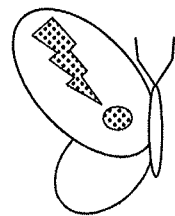
FIG. 4D is a diagram illustrating a corresponding example of an AR character definition and an image.

FIG. 4C illustrates a case in which the design of forewings=1 and FIG. 4D illustrates a case in which the design of forewings=2.

In FIGS. 4A to 4D, examples of insects are illustrated for convenience, but more complex characters may be used.

Figure 5:
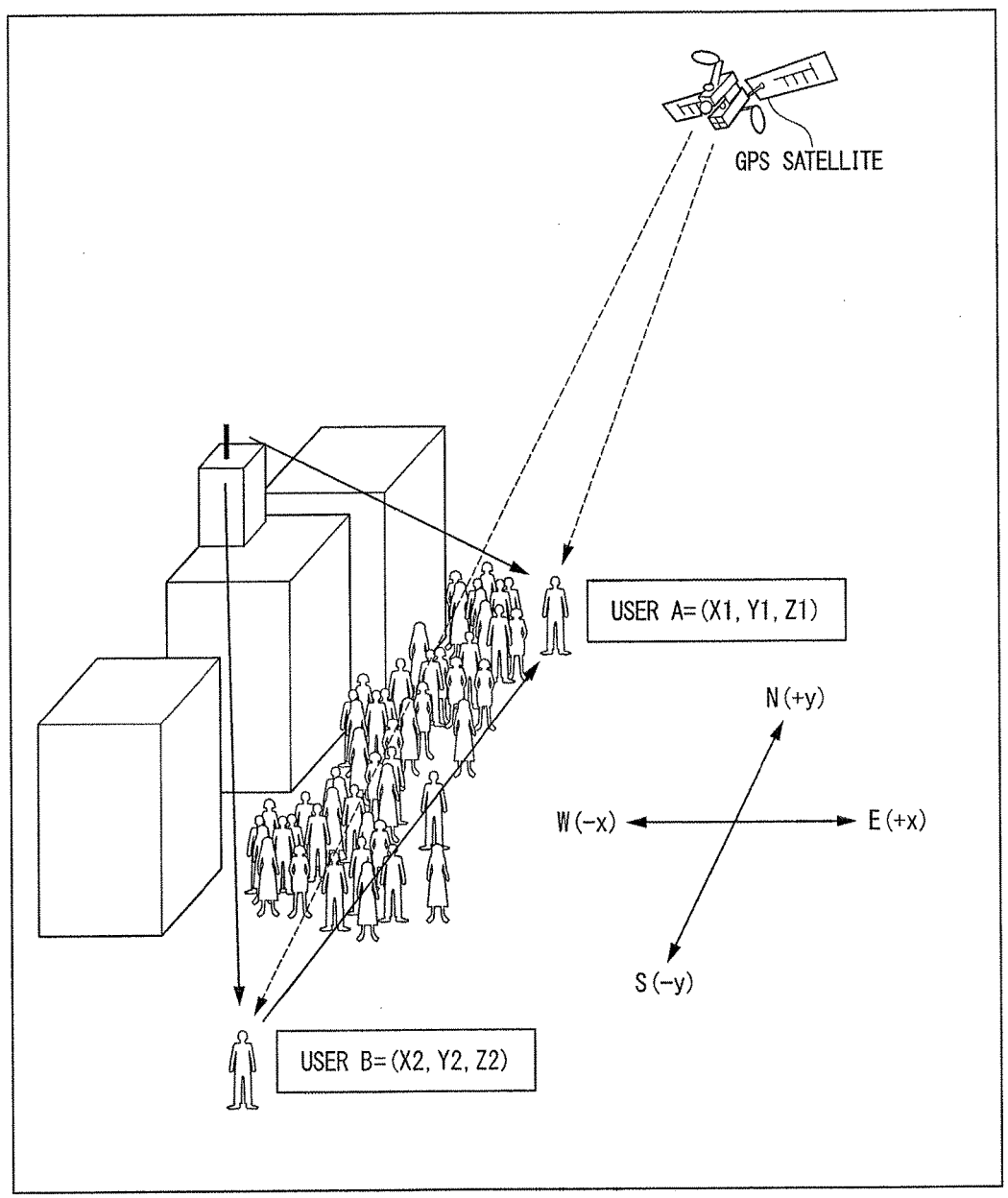
FIG. 5 is a diagram illustrating a positional relation between users as one example when the user to be photographed is far away.

FIG. 5 is a diagram illustrating a positional relation between users as one example when a user B to be photographed is at a long distance from a user A. The position coordinates of the user A are illustrated as (X1, Y1, and Z1) and the position coordinates of the user B are illustrated as (X2, Y2, and Z2).

Figure 6:
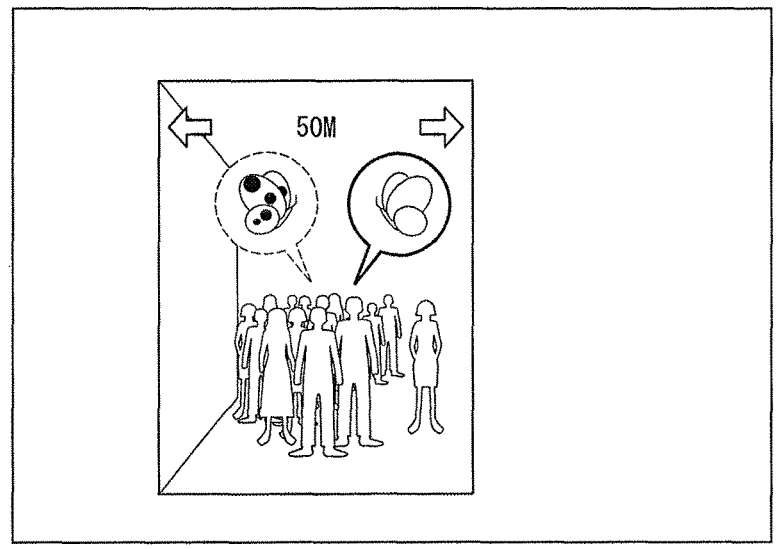
FIG. 6 is a diagram illustrating a display example of a display unit when the user to be photographed is far away.

FIG. 6 is a diagram illustrating a display example of the display unit 14 of the terminal device 1 when the user B to be photographed is far away.

The user and the customized defined graphic are matched by the above-described character definition record. Therefore, in the process of combining and displaying the graphic in a real scene, for example, the positions of the users A and B illustrated in FIG. 5 can be displayed as in FIG. 6 using small character graphics straightforwardly indicating the users to be photographed.

Even when two people are simultaneously displayed, small character graphics illustrated in FIG. 6 are used. Therefore, character graphics corresponding to two people can be displayed simultaneously on the display unit of the terminal device. Accordingly, when relations between the characters and the users are known, the character graphics can be displayed so that the people present on each side can be determined at a glance.

With regard to a numerical value indicating the distance illustrated in FIG. 6, a distance up to a selected character can be expressed by a numerical value.

For example, in FIG. 6, a character selected by the graphic in a speech balloon indicated by a thick solid line is illustrated and display of the distance from the user B to the user A illustrated in FIG. 5 is shown as an exemplary example.

Figure 7:
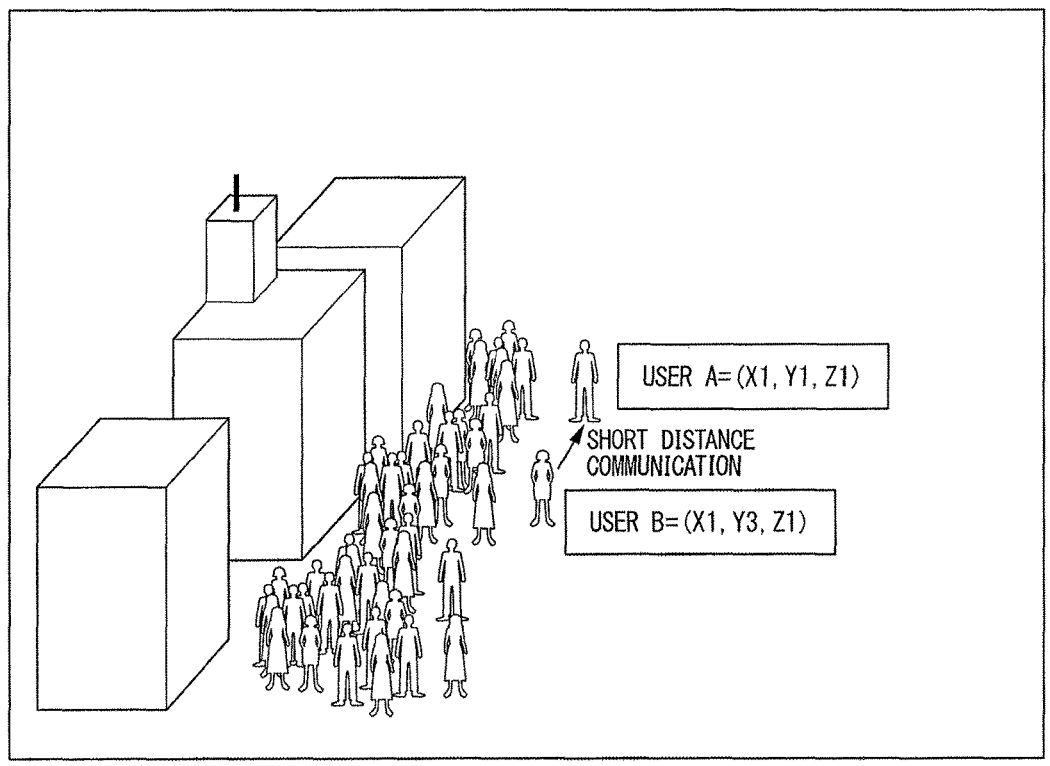
FIG. 7 is a diagram illustrating a positional relation between the users as one example when the user to be photographed is closeby.

FIG. 7 is a diagram illustrating a positional relation between the users in an example in which the user B to be photographed is a short distance from the user A.

FIG. 7 exemplifies a case in which the user B illustrated in FIG. 5 is close enough that short distance communication with the user A is possible.

Whether the user B is close enough that short distance communication with the user A is possible is determined by comparing the distance between the users A and B with a preset threshold value. The terminal device 1 used by the user A notifies of the state in which the short distance communication is possible. In this case, the user A can notify the user B through the terminal device 1 used by the user A himself or herself and the AR database server 3 that the short distance communication is possible and switch a mode of the terminal device 2 of the user B to a short distance communication mode.

Figure 8:
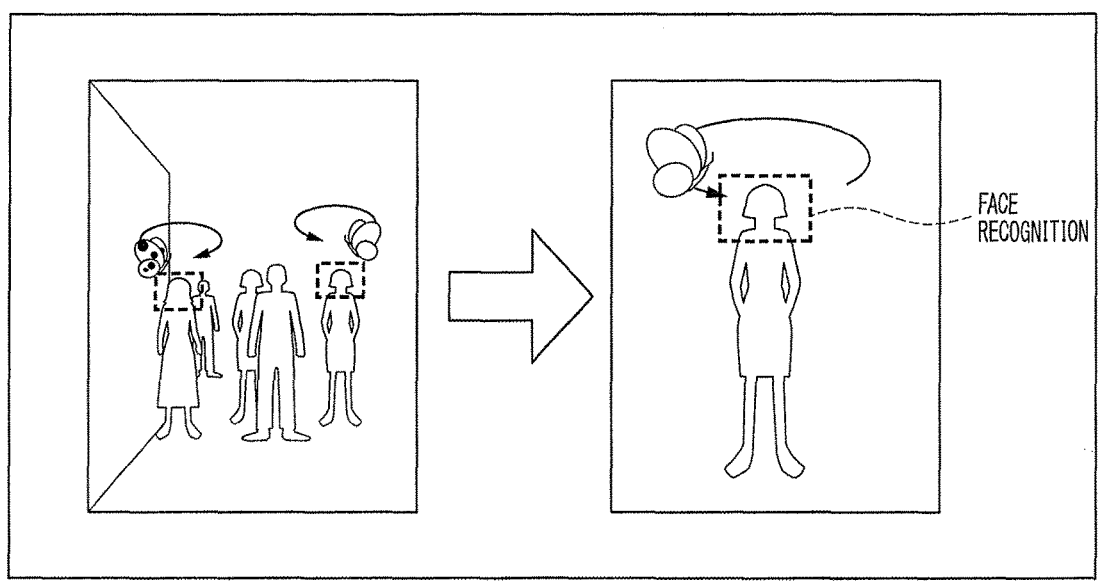
FIG. 8 is a diagram illustrating a display example of a display unit when the user to be photographed is closeby.

FIG. 8 is a diagram illustrating a display example of the display unit 14 when the user to b photographed is closeby.

FIG. 7 exemplifies the case in which the user B illustrated in FIG. 5 approaches the user A. In this case, for example, the display screen (here, the display unit 14 of the mobile phone terminal 1) of the terminal device 1 is as illustrated in FIG. 8.

Figure 9:
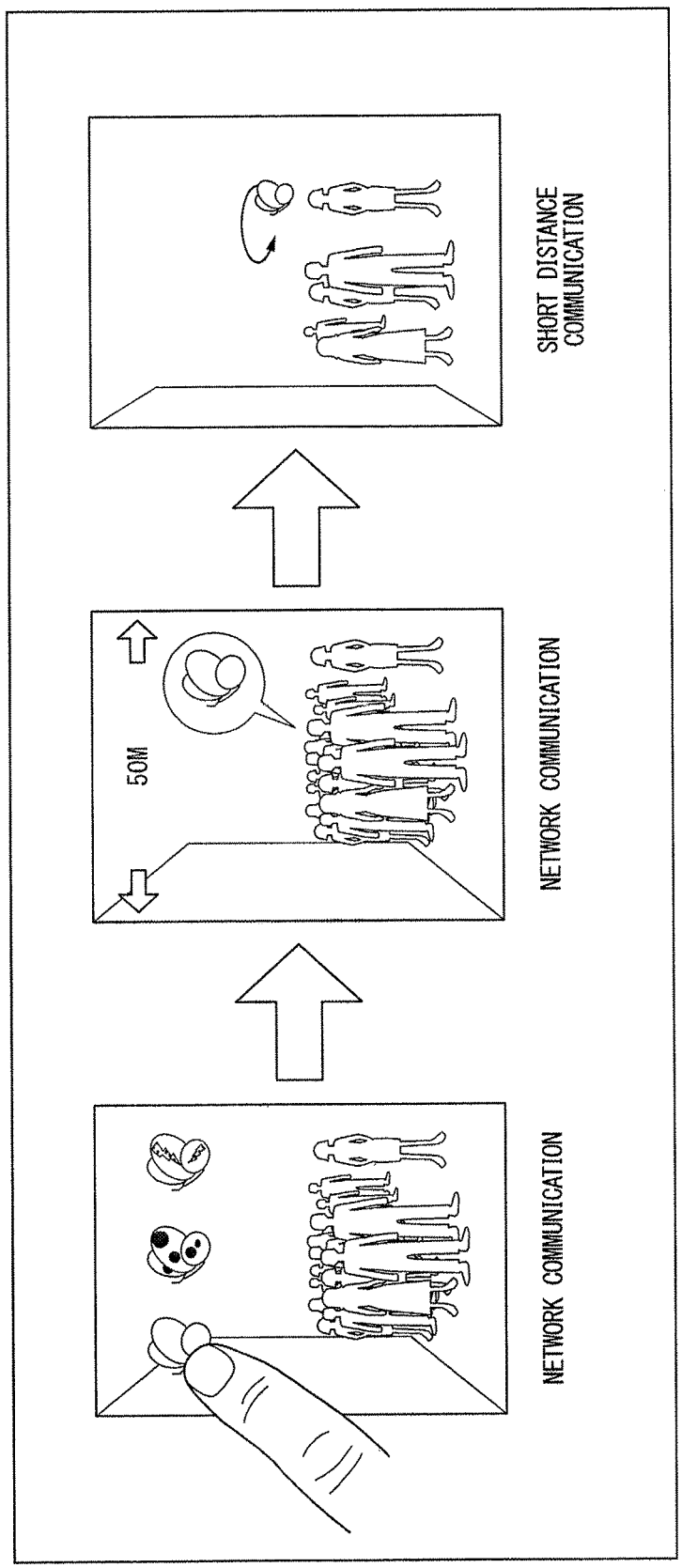
FIG. 9 is a diagram illustrating transition of display screens in a communication partner detection function of the individual identification character display system of the first embodiment of the present invention.

Here, since a character suitable for the size of a region is displayed at the relative position using a face-recognized region as a marker, as illustrated in FIG. 9, a character flying in the upper vicinity of the user is expressed.

As illustrated on the right in FIG. 8, when the user B to be photographed further approaches the user A, the size of the face region of the user B to be photographed is enlarged and the character graphic is configured to be expanded accordingly. Thus, a naturally perceived combination result can be obtained.

The display state illustrated in FIG. 8 can be displayed likewise even when this system is activated in the state in which the user B to be photographed is a short distance from the user A at the start. In this case, the AR character definition can be exchanged with the terminal device 2 (here, the mobile phone terminal 2) of the user B to be photographed by short distance communication means included in the short distance communication unit 171 of the terminal device 1 and can be displayed.

The character definition once acquired by the mobile phone terminal 1 of the photographer (as long as at least a search function or the like to be described below is not used) is stored in the second-person AR character definition 163. Therefore, the AR character definition can be displayed even when communication with the terminal device of the user to be photographed is not performed every time.

The above-described process is a process when a partner to be displayed is known, and thus the partner to be displayed is designated or the partner to be displayed is located directly ahead. However, a function of operating this system when it is not known whether the user B (the mobile phone terminal 2) to be photographed is present in a space directly ahead of the user A is a communication partner detection function shown in the screen example of FIG. 9.

FIG. 9 is a diagram illustrating transition of a display screen in the communication partner detection function of the individual identification character display system of the first embodiment of the present invention.

In FIG. 9, the drawing on the left end is a screen immediately after the communication partner detection function is activated.

In this case, characters of the search result obtained when the user A who is an operator inquires regarding the registered users present in front of the AR database server 3 via the network communication unit 17 are arranged based on the orientation direction of the camera of the terminal device 1 and measurement data of the position of the terminal device 1 and are displayed on the display unit 14.

This is because this display method enables an operation of selecting a specific individual among several search results to be performed easily when the several search results are obtained.

Here, as illustrated on the left side of FIG. 9, when a target character is designated in a touch manner on the display of the display unit 14, the screen can transition to the middle screen (that is, the same screen as the screen showing the above-described state illustrated in FIG. 6) of FIG. 9.

When the operator (the operator of the mobile phone terminal 1) walks of the screen display, the operator can arrive at the place in which the partner who is the specific individual is present. Thus, the screen transitions to the right side (that is, the same screen as the screen showing the above-described state illustrated on the left in FIG. 8) of FIG. 9.

In the above-described example, all of the registered users of the mobile phone terminal 1 on the left side of FIG. 9 are search targets. However, as will be described below in the second embodiment, when a group ID definition is introduced into the definition component of the AR character definition and only people with IDs identical with a group ID are displayed, it is possible to examine whether a companion with an ID identical with the group ID is in a place in which people are gathered.

When the group ID is introduced and only when the group ID is designated, a character can be configured to be designated in a touch manner. When the group ID is not designated, a character can be configured not to be designated in a touch manner. Thus, by not designating the group ID, it is also possible to realize a displaying method of seeing how close a user registered in this system is or appreciating a second person's defined characters.

Hereinafter, functions of the individual identification character display system described above of the first embodiment will be summarized.

In an embodiment of the present invention, a constitution is realized such that a face is recognized from a video in which a person is shown, a feature of the face part is digitized, a unique graphic customized as a graphic associated with the numerical value by an individual user is defined, definition information and the feature numerical value of the face part are stored in the terminal of the user, the definition information and the feature numerical value are exchanged with the terminal of a second user by wireless proximity communication or via a server on a network. Accordingly, the user of this system can operate numerous kinds of combined images and numerous kinds of markers.

When a character graphic is disposed, the size and position of an image of a recognized face are used. Thus, a relation with a specific target individual can be displayed with a natural expression and can be viewed.

When data is obtained via the AR database server 3 as a character graphic acquisition destination, position information of a data owner can be further acquired. Thus, since presence or absence of a specific member actually present within a video range of a camera is displayed as the customized character graphic based on the acquired information, it is possible to easily view the presence or absence of the specific member.

Further, means is provided to finally arrive at a location of a specific individual by designating the character graphic indicating the specific individual.

When the user reaches the vicinity in which the face region of the specific individual is cut, the image used to specify the individual can make a natural transition from an icon display state to a state in which the AR character graphic is displayed in the vicinity of the individual. Therefore, a unique graphic can be treated for the specific individual without damage to the sense of real world view of a relationship between the individual and the image in both cases in which the user to be photographed is far away and closeby.

Figure 10A:
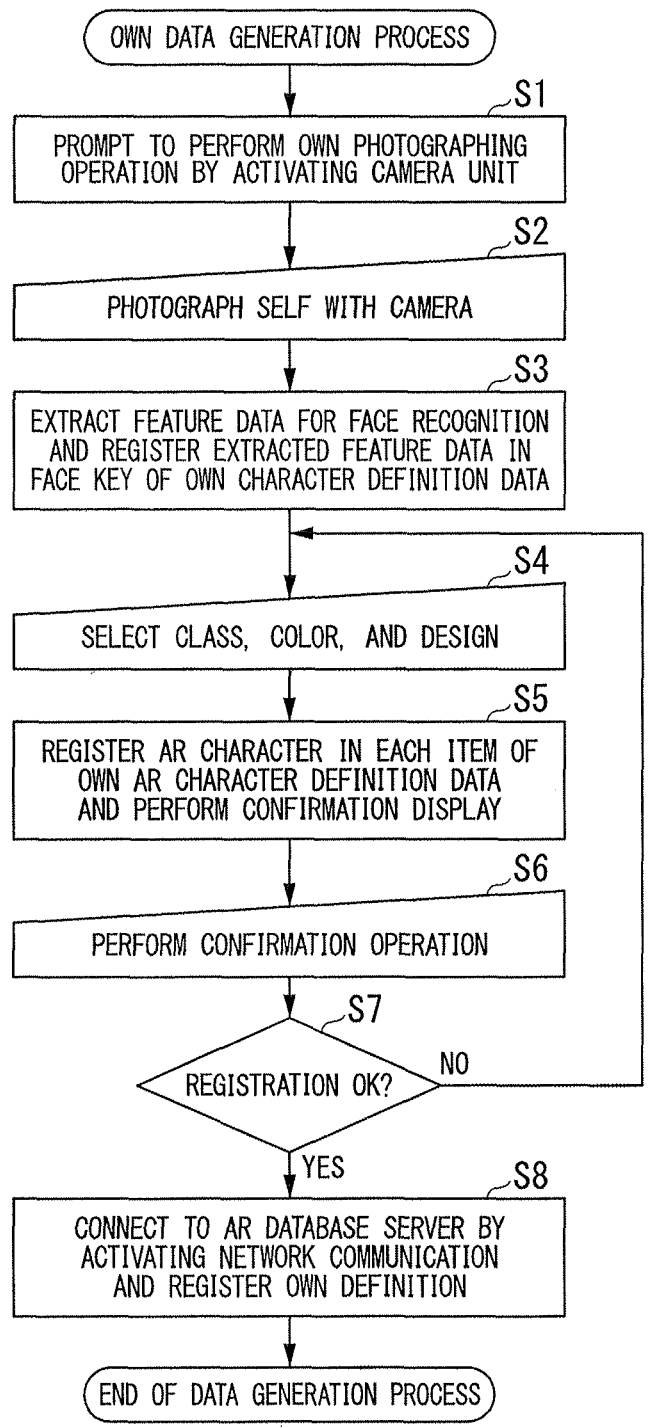
FIG. 10A is a flowchart illustrating a processing order when a user operates a terminal device and performs own AR character data definition in the individual identification character display system of the first embodiment of the present invention.

FIG. 10A is a flowchart illustrating processes when the user operates the terminal device and performs own AR character data definition in the mobile phone terminal 1 of the user and when the user acquires character definition data of a second user in the terminal device of the second user from the terminal device 2 of the second user in the individual identification character display system according to the first embodiment of the present invention.

First, a process when the user operates the terminal device 1 to define the own AR character data will be described.

(Step S1)

In step S1, the camera unit 11 is activated by an operator (a user prepares to take a photograph of himself or herself).

(Step S2)

In step S2, the user operating the camera unit 11 takes a photograph of himself or herself.

(Step S3)

In step S3, the face recognition unit 13 generates feature data of a face key by performing feature extraction for face recognition and registers the face key (see FIG. 3) which is one item of the own AR character definition 162 of the terminal device 1.

At this time, the user may take a photograph not only in a front side direction but also in the right and left directions, as necessary.

(Step S4)

In step S4, variations (class, color, design, and the like) of the definition illustrated as in FIGS. 4A to 4D are designated by the operator so that the outer appearance of the own AR character is defined.

(Step S5)

In step S5, the AR control unit 16 registers the AR character defined in step S4 in each item of the own AR character definition 162 (the registered content is displayed on the display unit 14).

(Step S6)

In step S6, the operator views the display screen of the display unit 14 to confirm the registration.

(Step S7)

In step S7, the AR control unit 16 verifies whether the registration is OK. When the registration is OK, the process proceeds to step S8. When the registration is not OK, the process returns to step S4.

That is, here, the operator performs and views the display based on the definition. When the display is a favorite display, the operator performs the registration. When the display is not a favorite display, the operator can designate the variations.

(Step S8)

In step S8, the AR control unit 16 registers the AR character defined in step S4 in the AR database server 3 via the network communication unit 171, and then the process ends.

That is, here, the character definition is configured to be placed even in the AR database server 3. In the case of OK, the designation result is registered in the AR database server 3 through the network communication. However, when the AR database server 3 performs a redirect process and the control method of acquiring terminal data every time is used, the registration in the AR database server 3 can be omitted.

Further, since a process of appropriately uploading the current position of the terminal device to the AR database server 3 and retaining the current position of the terminal device in the AR database server 3 is not a characteristic process of this system but is a known process, a description thereof will be omitted here.

Next, a process when the user acquires the definition of the AR character data of a second registered user from the terminal device of the second registered user will be described with reference to FIG. 10B.

(Step S21)

In step S21, input designation from the terminal device 2 of the second person from which data is acquired is presented by the operator.

(Step S22)

In step S22, the communication unit 17 determines whether the distance between the own terminal device and the terminal device of the second person from which the data is acquired is closer than the above-described predetermined threshold value set in advance. When the distance is closer, the process moves to step S26. When the distance is not closer, the process proceeds to step S23.

(Step S23)

In step S23, the communication unit 17 of the terminal device 1 accesses the AR database server 3 via the network communication unit 171 and causes the AR database server 3 to retrieve the AR character definition originating from the terminal device of the second person from which the data is acquired.

(Step S24)

In step S24, the communication unit 17 acquires, from the AR database server 3, positional information of the terminal device of the second person and the AR character definition originating from the terminal device of the second person from which the data is acquired.

(Step S25)

In step S25, the communication unit 17 stores the acquired AR character definition of the second person and the acquired positional information of the terminal device of the second person in the second-person AR character definition 163, and then the process ends.

When the AR character definition and the positional information are acquired through the long distance communication, it is necessary to display the distance and the direction of the partner (the second person) using GPS subsequently. Therefore, as described above, the positional information of the terminal device of the second person is acquired.

(Step S26)

In step S26, the communication unit 17 is connected to the terminal device of the second person by activating the short distance communication unit 172.

(Step S27)

In step S27, the communication unit 17 acquires the AR character definition originating from the terminal device of the second person from the terminal device of the second person. Thereafter, the process moves to step S25.

Figure 11A:
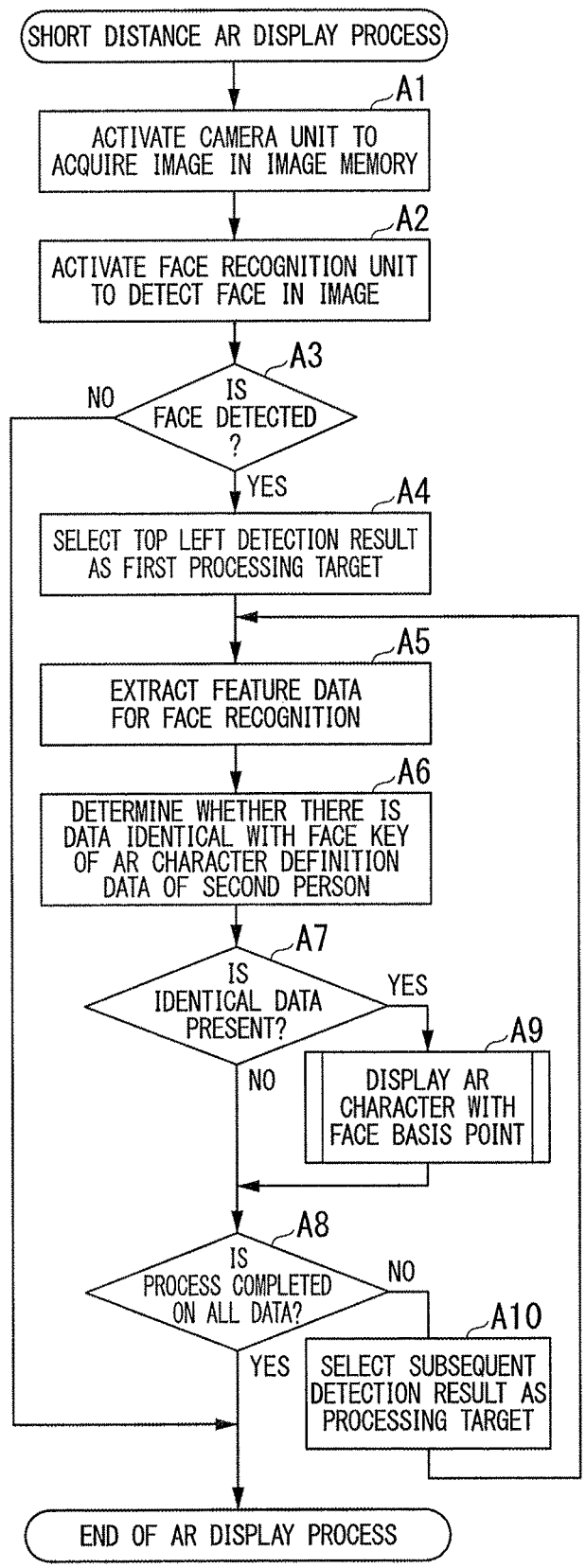
FIG. 11A is a flowchart illustrating a processing order when a partner terminal device of a communication partner is close and an AR character is displayed in the individual identification character display system of the first embodiment of the present invention.
Figure 11B:
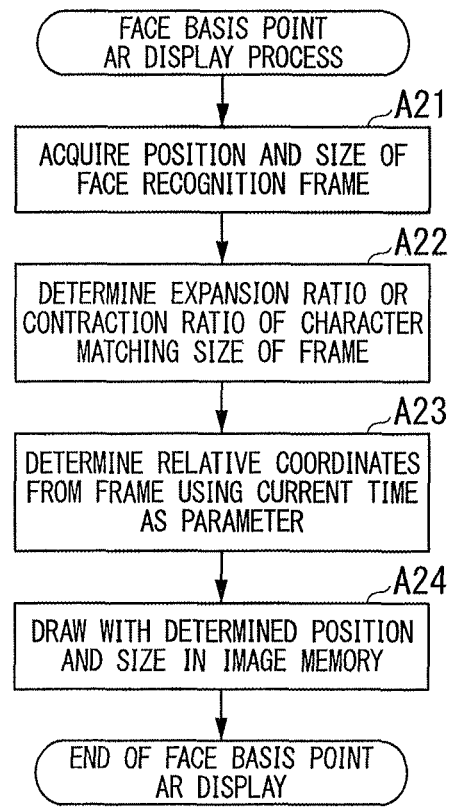
FIG. 11B is a flowchart illustrating a processing order when the partner terminal device is close and a face basis point is displayed in AR in the individual identification character display system of the first embodiment of the present invention.

FIGS. 11A and 11B are flowcharts illustrating a process when a partner terminal device of a communication partner is close and an AR character is displayed in the individual identification character display system of the first embodiment of the present invention.

The process illustrated in FIG. 11A is performed in the situation illustrated in FIG. 7.

Figure 10B:
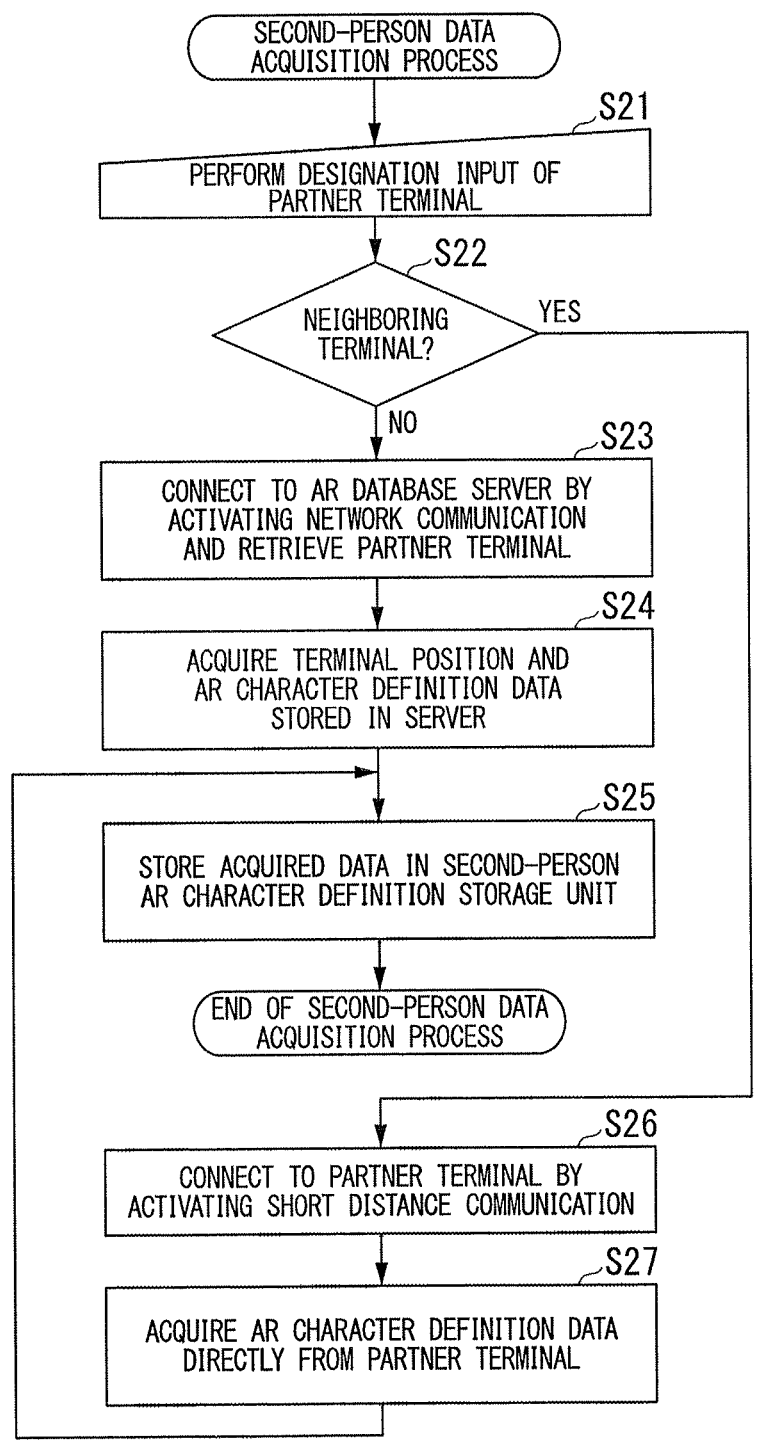
FIG. 10B is a flowchart illustrating a processing order when character definition data is acquired from a terminal device of another person in the individual identification character display system of the first embodiment of the present invention.

At the time point at which the process is performed, the second-person data acquisition process illustrated in FIG. 10B is assumed to have ended.

(Step A1)

In step A1, the operator operates the camera unit 11 of the terminal device 1 to acquire photographed imaging data.

(Step A2)

In step A2, the face recognition unit 13 detects data recognizable as a human face from the imaging data.

(Step A3)

In step A3, the face recognition unit 13 verifies whether to detect the data recognizable as a human face. When the data recognizable as a human face is detected, the process proceeds to step A4. When the data recognizable as a human face is not detected, the process ends.

(Step A4)

In step A4, when the face recognition unit 13 detects a plurality of pieces of data recognizable as a human face, the face recognition unit 13 selects, for example, a detection result located on the top left as the first processing target.

(Step A5)

In step A5, the face recognition unit 13 extracts the feature data for face recognition. For example, feature data of a face such as a ratio of the distance between eyes and a mouth to the distance between the eyes is extracted.

(Step A6)

In step A6, the face recognition unit 13 searches whether there is data identical with (or close to) the data of the face key of the second-person AR character definition 163.

(Step A7)

In step A7, the face recognition unit 13 verifies whether there is feature data close to the data of the face key of the second-person AR character definition 163 by the above-described search. When there is the feature data, a face basis point AR display process to be described below is performed in step S9, and then the process returns to step A8. Conversely, when there is no feature data, the process immediately proceeds to step A8.

(Step A8)

In step A8, the face recognition unit 13 verifies whether the above-described process is completed on all of the data recognized as the human face. When there is unprocessed data, the process moves to step A10. Conversely, when the above-described process is completed on all of the data, the process ends.

(Step A9)

The process of step A9 (subroutine) will be described below.

(Step A10)

In step A10, the face recognition unit 13 selects subsequent data recognized as the human face and the process returns to step A5.

Hereinafter, a processing order of the subroutine (the face basis point AR display process) performed in step A9 in the flowchart illustrated in FIG. 11A will be described with reference to FIG. 11B.

(Step A21)

In step S21, the face recognition unit 13 recognizes and detects a face image having a predetermined feature from a given image using a pattern matching method and acquires the position and the size of a face recognition frame.

(Step A22)

In step A22, the face recognition unit 13 expands (determines an expansion ratio) or contracts (determines a contraction ratio) of an AR character image of the size of the face recognition frame.

(Step A23)

In step A23, the face recognition unit 13 determines relative coordinates (that is, a relative drawing position) from the face recognition frame using a current time as a parameter.

By changing the above-described relative drawing position using the current time as the parameter, animated display such as flying near a face or fluttering up and down near a shoulder can be achieved.

(Step A24)

In step A24, the face recognition unit 13 draws the AR character image with the position and the size determined above in the image memory 12 and return to a calling origin is performed.

Thus, an image in which a character customized to a real video is combined is displayed.

When a plurality of faces are detected, the processes subsequent to the feature extraction process are assumed to be repeated on the subsequent detected face regions.

Thus, each of the defined AR characters can be caused to fly in correspondence with each person around a plurality of people present within the screen of the display unit 14 of the terminal device 1.

Figure 12:
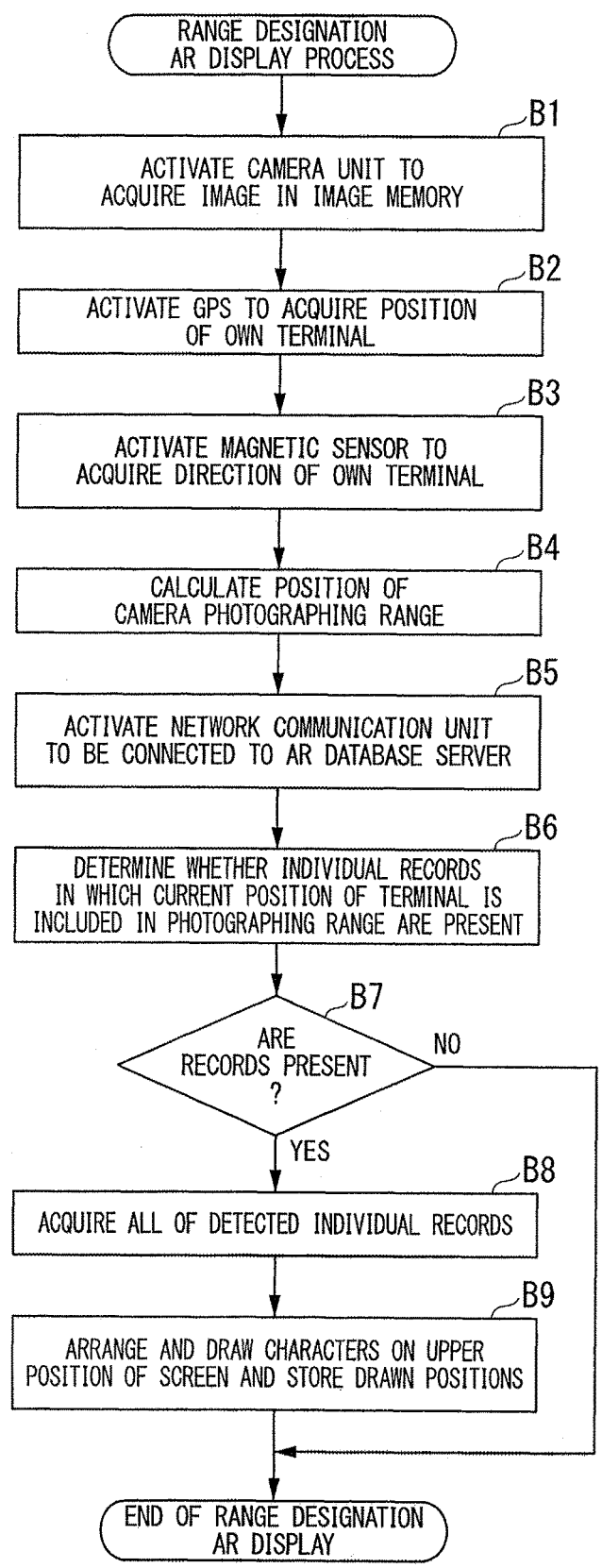
FIG. 12 is a flowchart illustrating a processing order when a photographing range is searched and an AR character is displayed in the individual identification character display system of the first embodiment of the present invention.

FIG. 12 is a flowchart illustrating a processing order when a photographing range is searched and an AR character is displayed in the individual identification character display system of the first embodiment of the present invention.

The flowchart illustrated in FIG. 12 indicates a process when the image illustrated on the left end of FIG. 9 is displayed.

(Step B1)

In step B1, the operator operates the camera unit 11 of the terminal device 1 to acquire imaging data of a scene, which is a display base, directly ahead of the operator.

(Step B2)

In step B2, the operator activates the GPS/magnetic sensor 15 so that the position of the terminal device 1 is confirmed and is acquired.

(Step B3)

In step B3, a direction in which the camera of the camera unit 11 is oriented is acquired via the GPS/magnetic sensor 15 activated by the operator.

(Step B4)

In step B4, the camera unit 11 calculates the position of the camera photographing range.

(Step B5)

In step B5, the network communication unit 171 is connected to the AR database server 3.

(Step B6)

In step B6, the network communication unit 171 accesses the AR database server 3 and causes the AR database server 3 to search whether the individual records, which are registered in the terminal device of a second person and in which the current position of the terminal device 1 is included in the camera photographing range, are present in the AR character database 34.

Here, for example, when an angle of view of the camera is assumed to be diagonal at about 60 degrees and a range is assumed to be up to 80 m on the front side, the AR database server 3 is instructed to search users of the terminal devices present within a circle with a radius of 30 m ahead of 40 m in the direction in which the camera is oriented from its own position.

More accurately, the AR database server 3 is caused to retrieve the terminal devices present within a circle with a radius of 10 m ahead of 20 m, the terminal devices present within a circle with a radius of 20 m ahead of 40 m, and the terminal devices present within a circle with a radius of 30 m ahead of 60 m.

(Step B7)

In step B7, the network communication unit 171 verifies whether the presence of the individual record is replied from the AR database server 3. When the presence of the individual record is replied, the process proceeds to step B8. When the presence of the individual record is not replied, the process ends.

(Step B8)

In step B8, the network communication unit 171 acquires all of the individual records of the second person of which the presence is replied from the AR database server 3 and transmits the individual records to the AR control unit 16.

(Step B9)

In step B9, the AR control unit 16 arranges and draws all of the acquired AR characters for the individual records of the second people present in a tile shape in the image memory 12, displays the AR characters on the screen of the display unit 14, and stores which AR characters are arranged at which positions (this is because it is necessary to determine which an AR character is selected when a display screen is touched later).

Figure 13:
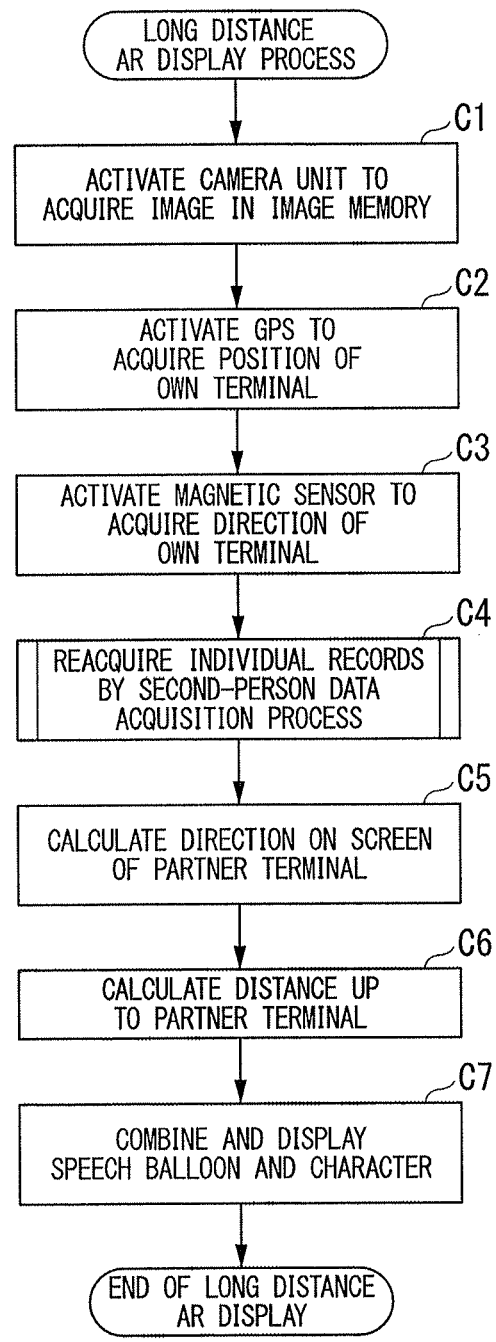
FIG. 13 is a flowchart illustrating a processing order when the partner terminal device is not close and an AR character is displayed in the individual identification character display system of the first embodiment of the present invention.

FIG. 13 is a flowchart illustrating a processing order when the partner terminal device is not close and an AR character is displayed in the individual identification character display system of the first embodiment of the present invention.

The process of the flowchart illustrated in FIG. 13 is performed when the display of FIG. 6 is performed in the situation illustrated in FIG. 5 (the situation in which the users A and B are distant from each other).

Here, an AR character of a second individual stored in the second-person AR character definition 163 of the terminal device 1 is designated as an AR character display target.

(Step C1)

In step C1, the operator operates the camera of the camera unit 11 to photograph a video which is a display base and the photographed image data is acquired in the image memory 12.

(Step C2)

In step C2, positional information regarding a position at which the terminal device 1 is present is acquired via the GPS/magnetic sensor 15 activated by the operator.

(Step C3)

In step C3, the direction of the terminal device 1 is acquired via the GPS/magnetic sensor 15 activated by the operator.

(Step C4)

In step C4, to update the positions of the partner terminal devices, the AR control unit 16 performs the second-person data acquisition process illustrated in FIG. 10B and reacquires the individual records of the second people.

At this time, network communication means in which the is mediated is used as communication means with the AR database server 3. However, since information other than the positional information of the partner terminal device is already retained, only the positional information of the partner terminal device may be acquired.

(Step C5)

In step C5, the AR control unit 16 calculates the direction of the partner terminal device on the display screen of the display unit 14, when the partner terminal device is viewed from the terminal device 1.

(Step C6)

In step C6, the AR control unit 16 calculates the distance between the terminal device 1 and the partner terminal device.

(Step C7)

In step C7, the AR control unit 16 combines the AR character corresponding to the partner terminal device with a speech balloon graphic in the image memory 12 and displays the combined result on an approximate place on the display screen of the display unit 14, and then the process ends. Thus, the screen display exemplified in FIG. 6 is output.

Figure 14:
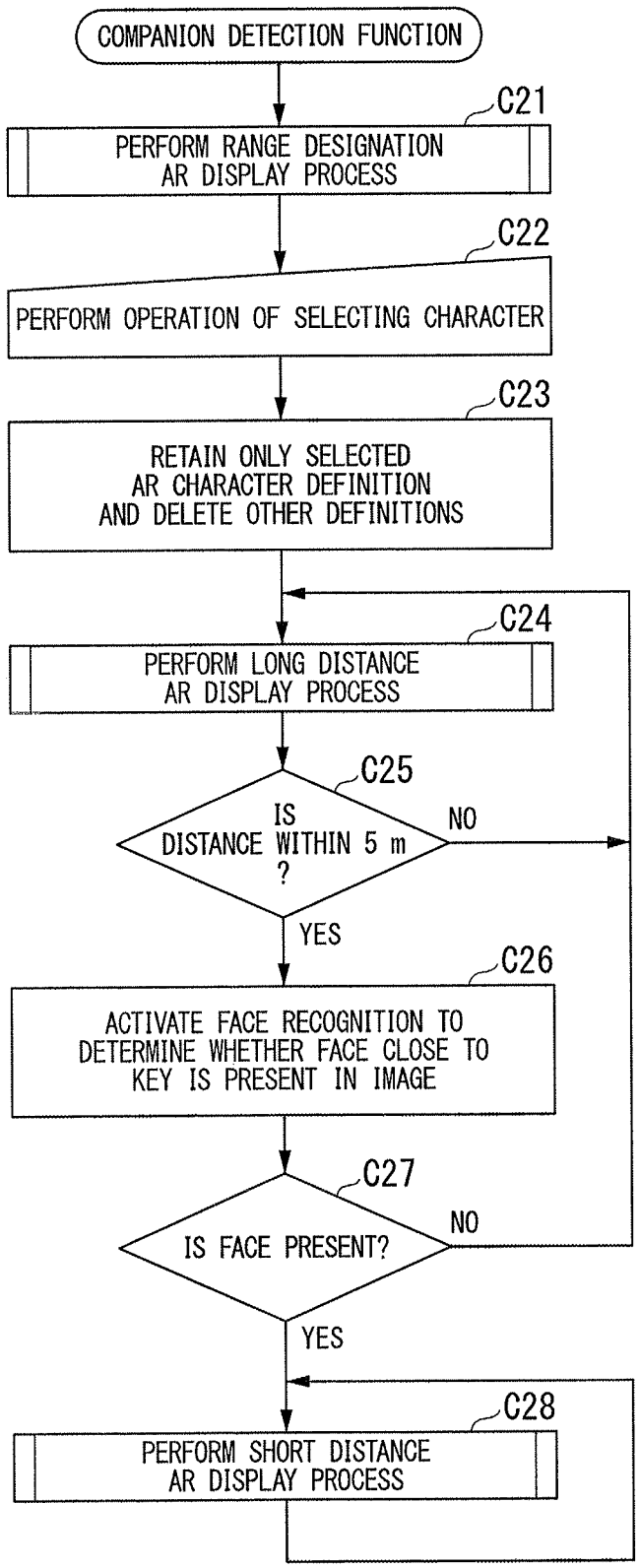
FIG. 14 is a flowchart illustrating a processing order when a communication partner detection function is realized in the individual identification character display system of the first embodiment of the present invention.

FIG. 14 is a flowchart illustrating a processing order when a communication partner detection function is realized in the individual identification character display system according to the first embodiment of the present invention.

(Step C21)

In step C21, the AR control unit 16 performs the range designation AR display process illustrated in FIG. 12. Thus, the image illustrated on the left in FIG. 9 is displayed.

(Step C22)

In step C22, the operator designates the drawing position of one AR character being displayed in the image displayed on the left in FIG. 9.

The AR control unit 16 stores the drawing position of the AR character in the process of step B9 of FIG. 12. Therefore, the AR control unit 16 can comprehend which AR character is selected by the above-described designation, and thus can determine which definition record is stored in the second-person AR character definition unit 163.

(Step C23)

In step C23, the AR control unit 16 retains only the above-described selected definition and deletes the other definitions.

(Step C24)

In step C24, the AR control unit 16 performs the long distance AR display process illustrated in FIG. 13.

Thus, since the display screen of the display unit 14 transitions to the graphic display state in the middle illustrated in FIG. 9, the operator can walk viewing this display and approach the partner terminal device.

(Step C25)

In step C25, the AR control unit 16 verifies whether the distance between the terminal device 1 and the partner terminal device calculated in the process of step C6 illustrated in FIG. 13 is within 5 m. When the distance is within 5 m, the process proceeds to step C26. Conversely, when the distance is not within 5 m, the process returns to step C24.

(Step C26)

In step C26, for example, when the distance with the partner is within 5 m, as illustrated in FIG. 7, the AR control 16 activates the face recognition unit 13 to determine whether a face image close to the key stored in the designated definition is present in the image acquired from the camera unit 11.

(Step C27)

In step C27, the AR control unit 16 verifies whether the face image close to the key is searched in the process of step C25. When the face image close to the key is searched, the process proceeds to step C28. When the face image close to the key is not searched, the process returns to step C24.

(Step C28)

In step C28, the AR control unit 16 performs the short distance AR display process illustrated in FIG. 11A.

Thus, the display screen of the display unit 14 transitions to the display state illustrated on the right in FIG. 9.

In the processing order illustrated in the flowchart of FIG. 14, as the process when the operator is close to the search target, when the operator is within 5 m, the face recognition unit 13 is activated to verify that the face image can be detected, and then the short distance AR display process illustrated in FIG. 11A is performed. However, the face image detection process may be omitted and the short distance AR display process illustrated in FIG. 11A may be performed immediately thereafter.

However, in this case, there is a probability that the character display may disappear temporarily from the display screen of the display unit 14. Instead, since it is not necessary to perform the face image recognition process after the long distance AR display process of step C24, there is an advantage that the process is simplified and is lightened.

The individual identification character display system of this embodiment can detect a specific individual by performing the face image recognition process on an image photographed by a user and combine and draw an AR character customized for each individual using a face part of the detected individual as a marker. Therefore, for example, it is possible to obtain the advantage of providing an image in which a work of animation including characters such as a main character and secondary characters associated with the main character are mixed with the real world and presented.

Since the mobile terminal device owned by an individual can be configured to serve as an AR data server as means for delivering character data, a customization operation is easy. Further, the customization performed by an individual user can be instantaneously effective and can also be reflected in a video viewed on a second terminal device.

When the terminal devices are not close to each other, the network communication means of the network communication unit 171 is configured to deliver the AR character data in cooperation with the AR database server 3. Therefore, when the terminal devices are not close to each other but a second registered user is present near the own terminal device, the rough position of the second registered user can be expressed. Further, when a plurality of second registered users are present near the own terminal device, the plurality of registered users can be indicated by the AR character images set by the second registered users.

At this time, only a specific individual can be designated and tracked by designating one of the plurality of AR characters set by the second registered users with a finger.

[Second Embodiment]

In the above-described first embodiment, the case in which the AR character definition data is also retained in the cooperating server (that is, the AR database server 3) has been described. In the present invention, generally, only terminal IDs, user names, and the current positions of terminal devices may be configured to be retained in a cooperating server device and face keys and character definition may be configured to be acquired by redirecting an acquisition request to the terminal device of an individual user registered in this system.

Positional information indicating the current position of an individual terminal device may not be retained either and only the user names and the terminal IDs may be retained in the cooperating server device. Then, the current position of the terminal device may be acquired by remote control from the server device and a part of the AR character definition data may be acquired together with the key and the character definition data from the terminal device acquiring the current position.

In this case, it is possible to obtain not only the advantage of reducing the amount of data retained in the server device but also the advantage of improving tracking accuracy of the AR character definition data or the position of the terminal device.

However, in this case, there is a restriction that a partner terminal device needs to be present in a communicable place.

Accordingly, in a second embodiment of the present invention to be described below, to ease the above restriction, specifically, a group ID is added to each piece of AR character definition data retained in the terminal device of an individual user registered in this system and AR character definition data retained in a cooperating server (here, also referred to as an AR database server 3).

Hereinafter, the second embodiment of the present invention will be described with reference to the drawings.

Figure 15:
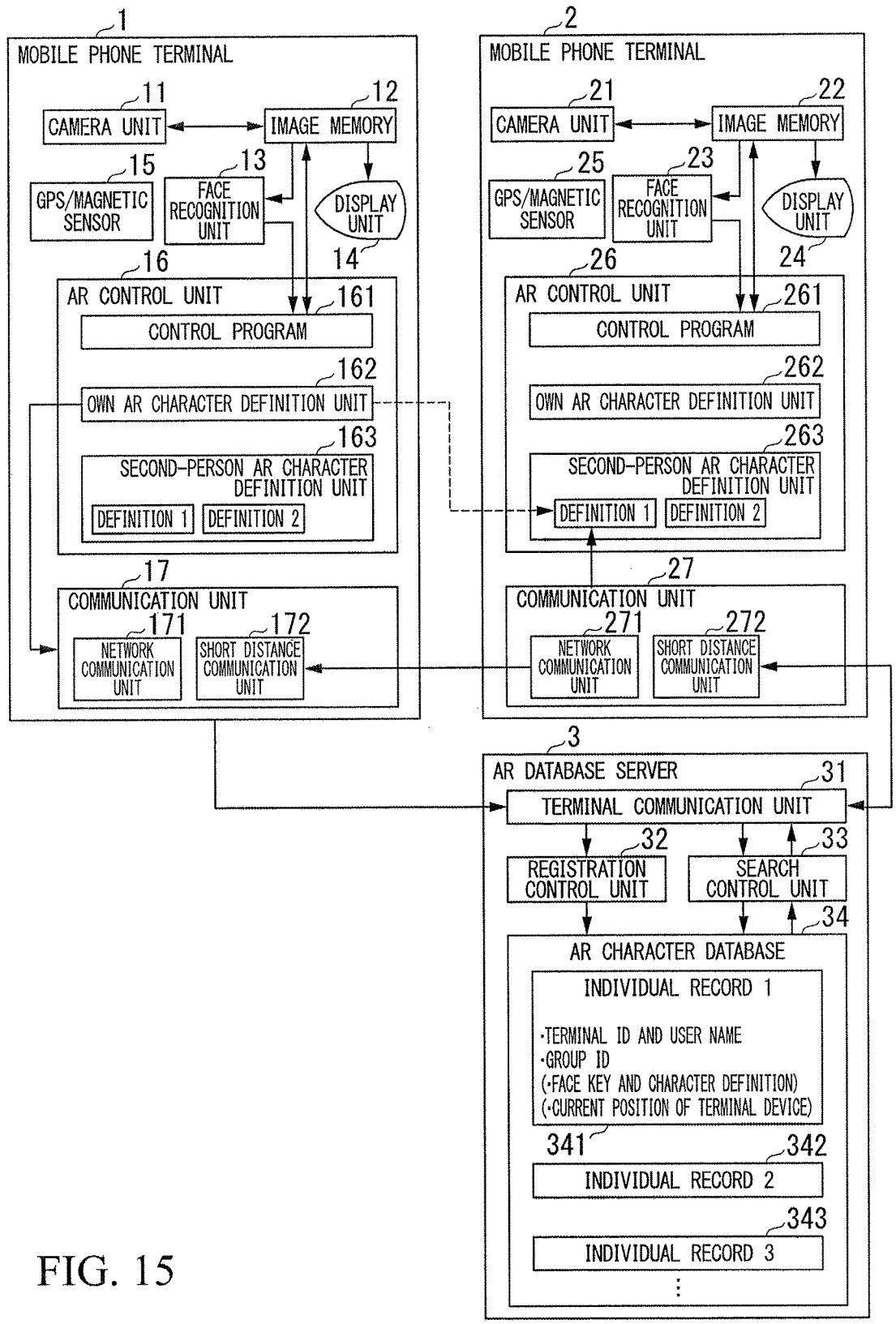
FIG. 15 is a diagram illustrating an overall constitution of an individual identification character display system of a second embodiment of the present invention.

FIG. 15 is a diagram illustrating an overall constitution of an individual identification character display system of the second embodiment of the present invention.

The overall constitution of an individual identification character display system of the second embodiment of the present invention illustrated in FIG. 15 is the same as the overall constitution of the individual identification character display system of the first embodiment of the present invention illustrated in FIG. 1. However, the individual identification character display system of the second embodiment is different from the individual identification character display system of the first embodiment of the present invention illustrated in FIG. 1 in that a face key, a character definition, and the current position of a terminal stored in an AR character database 34 of an AR database server 3 are included in parentheses.

This expression is meant to indicate that the above-described data is not actually retained in the AR character database 34 of the AR database server 3. The AR character database 34 merely transmits the data that are acquired from other designated terminal devices.

FIG. 16 is a data structure diagram illustrating the structure of individual record data as one example in the individual identification character display system of the second embodiment of the present invention.

Individual record data illustrated in FIG. 16 refers to individual record data retained by the terminal device of an individual user registered in this system. Likewise, terminal IDs, names, and group IDs are also assumed to be retained in the AR database server 3.

Hereinafter, a process of the individual identification character display system of the second embodiment will be described with a focus on the function of the AR database server 3.

When a request to transmit the AR character definition data is issued from one of the terminal devices of the registered users to the AR database server 3, the AR database server 3 requests the terminal device of the registered user designated by the communication request transmit the AR character definition data.

Thus, when the designated terminal device replies, the AR character definition data is acquired from the designated terminal device and the AR character definition data in the designated terminal device is transmitted to the terminal device of the registered user which is the first requester. However, when the AR database server 3 is unable to communicate with the terminal device of the registered user designated by the communication request, the AR character database 34 searches a second terminal device having the same group ID as the group ID of the user and attempts to make a connection with the searched terminal device.

When the terminal device replies and the AR character definition data of the correspond user is retained in the second-person AR character definition of the terminal device, the retained AR character definition data is transmitted so as to be transmitted to the terminal device of the registered user which is the first requester.

In such a constitution, there is a high probability of the terminal devices having the same group ID retaining the AR character definition data of the requested terminal device. Therefore, it is possible to improve the probability of acquiring the AR character definition data of the requested user.

Figure 17:
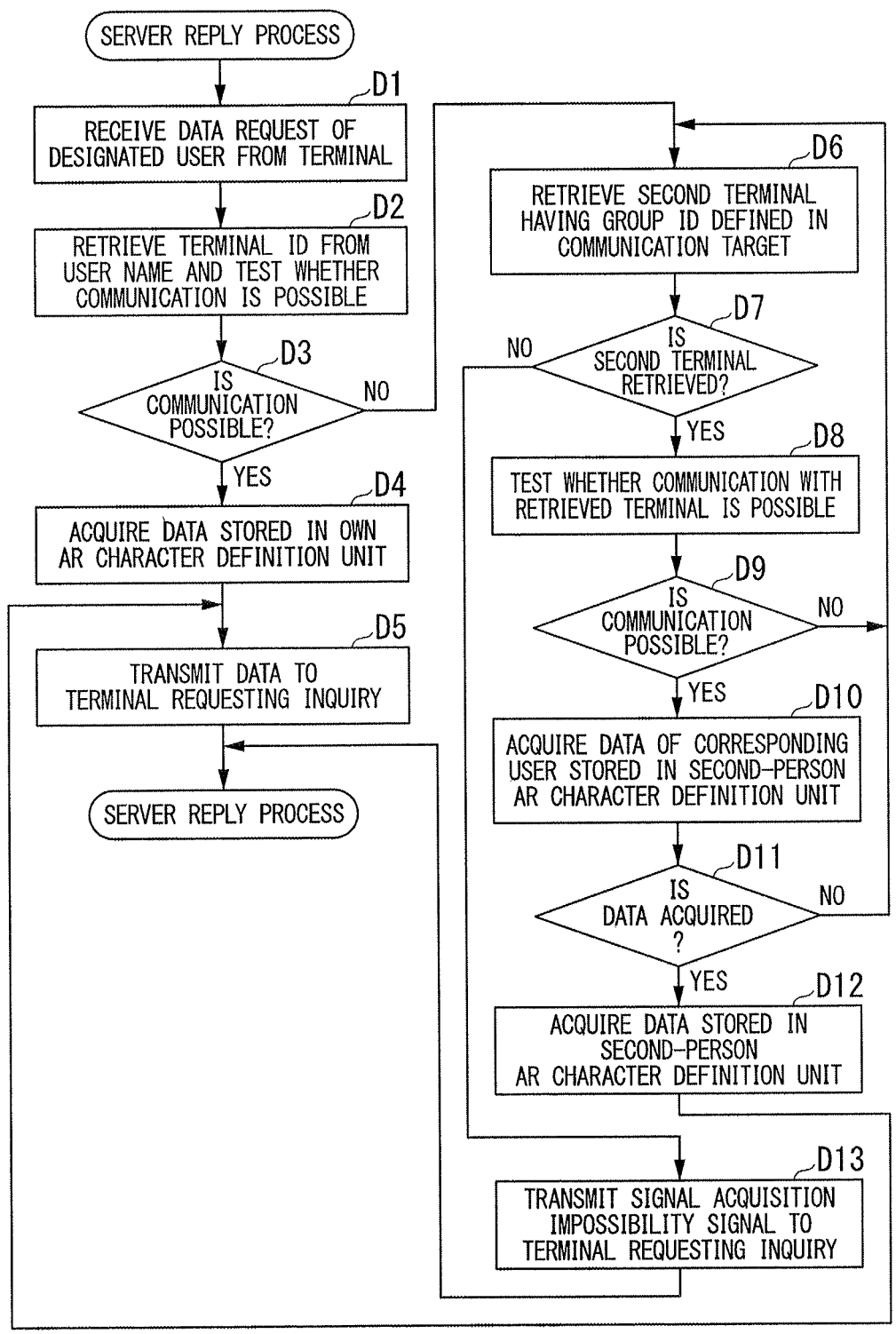
FIG. 17 is a flowchart illustrating a processing order when data of an AR database server is transmitted in the individual identification character display system of the second embodiment of the present invention.

FIG. 17 is a flowchart illustrating a processing order when data of an AR database server 3 is transmitted in the individual identification character display system of the second embodiment of the present invention.

(Step D1)

In step D1, the AR database server 3 receives a request of the AR character definition data of the user of a designated partner terminal device from, for example, the mobile phone terminal 1 by the same process as the second-person data acquisition process in FIG. 10B in the first embodiment.

(Step D2)

In step D2, the search control unit 33 of the AR database server 3 retrieves the terminal ID of the registered user designated with a name in the request of the AR character definition data in the AR character database 34 and tests whether communication with the terminal device having the terminal ID of the search result via the terminal communication unit 31 is possible.

(Step D3)

In step D3, the search control unit 33 verifies whether the communication with the terminal device of the registered user is possible according to the result of the test in step D2 performed to test whether the communication with the terminal device of the designated registered user is possible. When the communication with the terminal device of the designated registered user is possible, the process proceeds to step D4. When the communication with the terminal device designated registered user is not possible, the process moves to step D6.

(Step D4)

In step D4, the search control unit 33 acquires the AR character definition data stored in the AR character definition of the terminal device of the registered user.

(Step D5)

In step D5, the search control unit 33 transmits the AR character definition data acquired in the process of step D4 to the terminal device (here, the mobile phone terminal 1) of the original requester via the terminal communication unit 31.

(Step D6)

In step D6, the search control unit 33 retrieves a second terminal device having the group ID defined as a communication target in the request in the AR character database 34.

(Step D7)

In step D7, the search control unit 33 verifies whether the second terminal device having the group ID is searched as the result of the search process of step D6. When the second terminal device having the group ID is searched, the process proceeds to step D8. When the second terminal device having the group ID is not searched, the process moves to step D13.

(Step D8)

In step D8, the search control unit 33 tests whether communication with the terminal device having a terminal ID of the search result is possible.

(Step D9)

In step D9, the search control unit 33 verifies whether the communication with the terminal device having the terminal ID of the search result is possible based on the result of the test in step D8. When the communication with the terminal device is possible, the process proceeds to step D10. When the communication with the terminal device is not possible, the process returns to step D6.

(Step D10)

In step D10, the search control unit 33 acquires the data of the terminal device of the registered user designated with a name in the request and stored in the AR character definition of the terminal device having the terminal ID of the search result.

(Step D11)

In step D11, the search control unit 33 verifies whether the acquisition of the data succeeds. When the acquisition of the data succeeds, the process proceeds to step D12. When the acquisition of the data does not succeed, the process returns to step D6.

(Step D12)

In step D12, the search control unit 33 acquires the AR character definition data of the terminal device of the registered user designated with the name in the above-described request and stored in the AR character definition of the terminal device having the terminal ID of the search result. Thereafter, the process moves to step D5.

(Step D13)

In step D13, the search control unit 33 replies to the terminal device (here, the mobile phone terminal 1) of the first requester with a signal indicating that "the AR character definition data of the person designated with the name is unacquirable."

Figure 18:
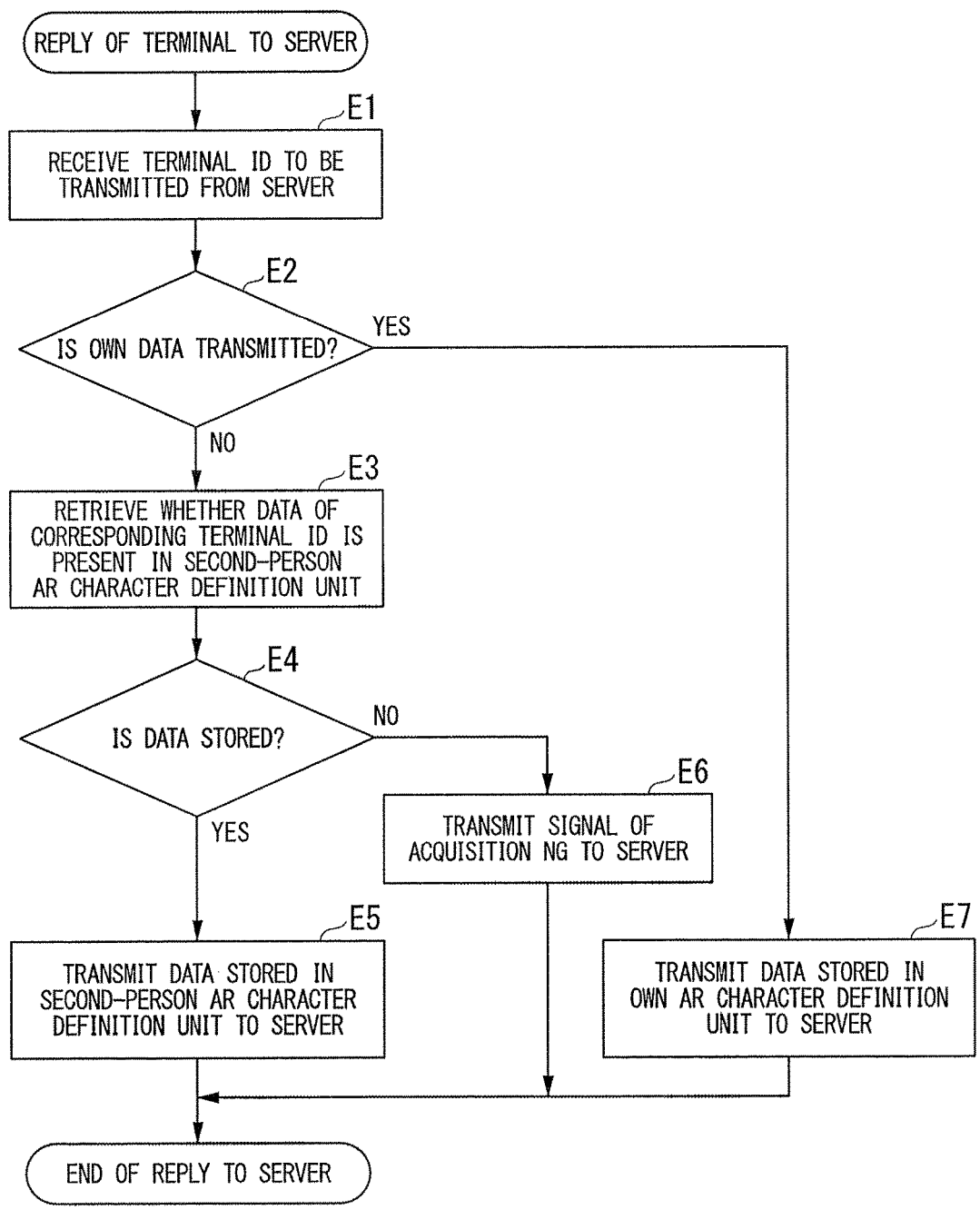
FIG. 18 is a flowchart illustrating a processing order of a terminal device when data is transmitted from a terminal device side to the AR database server in the individual identification character display system of the second embodiment of the present invention.

FIG. 18 is a flowchart illustrating a processing order of a terminal device when data is transmitted from a terminal device side to the AR database server 3 in the individual identification character display system of the second embodiment of the present invention.

(Step E1)

In step E1, for example, the network communication unit 171 of the mobile phone terminal 1 receives a request to transmit a terminal ID transmitted by the terminal device 2 (mobile phone terminal 2) which is to transmit data from the AR database server 3.

(Step E2)

In step E2, the AR control unit 16 of the terminal device 1 determines whether input data of the own AR character definition 162 is requested. When the input data of the own AR character definition 162 is requested, the process moves to step E7. When the input data of the own AR character definition 162 is not requested, the process proceeds to step E3.

(Step E3)

In step E3, the AR control unit 16 of the terminal device 1 verifies whether the data of the received terminal ID is stored in the second-person AR character definition 163.

(Step E4)

In step E4, the AR control unit 16 of the terminal device 1 determines whether the data of the corresponding terminal ID is stored in the second-person AR character definition 163 through the verification in step E3. When the data of the corresponding terminal ID is stored in the second-person AR character definition 163, the process proceeds to step E5. Conversely, when the data of the corresponding terminal ID is not stored, the process moves to step E6.

(Step E5)

In step E5, the AR control unit 16 acquires the received data of the terminal ID stored in the second-person AR character definition 163 and transmits the data to the AR database server 3 via the network communication unit 171. Then, the process ends.

(Step E6)

In step E6, the AR control unit 16 transmits a signal indicating that the data of the corresponding terminal ID is not stored in the AR database server 3 via the network communication unit 171. Then, the process ends.

(Step E7)

In step E7, the AR control unit 16 acquires the data of the corresponding terminal ID stored in the own AR character definition 162 and transmits the data to the AR database server 3 via the network communication unit 171. Then, the process ends.

Through these processes, the group of the plurality of terminal devices having the same group ID and the AR database server 3 fulfills the role of a data cache server. The terminal device (here, the mobile phone terminal 1) first requesting the AR character definition data can acquire the requested data with high accuracy.

In the above-described constitution, as illustrated in FIG. 9, when an AR character image of a user present within a specific range is designated in a touch manner with a finger and the AR character image touched with the finger is an AR character image of a person having no same group ID, the search of the person can be controlled such that the person is not searched even when the AR character image is designated in the touch manner with the finger.

In this case, the user registered in this system can examine how many users registered in this system whose AR character images are designated in the touch manner by a finger are present directly ahead of the user, but personal information of the registered users is protected.

When this display is performed, the AR database server 3 can be set in advance such that the AR database server 3 searches only people having the same group ID.

In each process in which the above-described group ID is referred to, the setting of the group ID can be prevented from leaking to the second person by exchanging not the character string of the group ID itself but a hash code calculated from a character string of the group ID at the time of communication.

At least some of the processes of the constituent elements of the individual identification character display system of the present invention may be executed under the control of a computer. Further, a computer program causing a computer to execute the above-described processes in the processing orders illustrated in the flowcharts of FIGS. 10A to 14, 17, and 18 may be stored in a computer-readable recording medium such as a semiconductor memory, a CD-ROM, or a magnetic tape so as to be distributed. A computer of a category including at least a microcomputer, a personal computer, and a general-purpose computer may read the above-described computer program from the above-described recording medium and execute the computer program.

Priority is claimed on Japanese Patent Application No. 2011-093810, filed Apr. 20, 2011, the content of which is incorporated herein by reference.

INDUSTRIAL APPLICABILITY

It is possible to provide an individual identification character display system capable of displaying an individual identification character used to view a specific individual as well in the vicinity of a captured image of the specific individual.

DESCRIPTION OF REFERENCE SYMBOLS

1 Mobile phone terminal
2 Mobile phone terminal
3 AR database server
11 Camera unit
12 Image memory
13 Face recognition unit
14 Display unit
15 GPS/Magnetic sensor
16 AR control unit
17 Communication unit
31 Terminal communication unit
32 Registration control unit
33 Search control unit
34 AR character database
161 Control program
162 Own AR character definition
163 second-person AR character definition
171 Network communication unit
172 Short distance communication unit

The invention claimed is:

1. An individual identification character display system that combines a CG-drawn image with an image of the real world photographed by a camera mounted on a terminal device, the individual identification character display system comprising:

detection unit used to recognize and detect, from image data of the real world photographed by the camera, a partial region having a feature of a predetermined subject in an image region displaying the image data by a pattern matching method;

a drawing combination unit that combines a predetermined CG image retained in advance corresponding to the subject featured in the partial region with the detected partial region of the image of the real world, the predetermined CG image identifying a specific individual;

an image display unit that displays the image of the real world including the combined image region; and a direct proximity communication unit configured to directly exchange information, including at least the feature of the predetermined subject, regarding the individual record of each registered individual user retained by each of the terminal device and a second terminal device used by a second registered user to be referred between the terminal device and the second terminal device, wherein the drawing combination unit provides an animation in which a graphic associated with a feature numerical value of a face of the subject is flying in the vicinity of a region of the face by changing a relative position of the graphic using time as a key.

2. The individual identification character display system according to claim 1, wherein a terminal device used by a registered individual user retains an individual record in which information regarding each registered individual user also including the second registered user is recorded, and breakdowns of the individual record of each registered individual user include information defining a shape of the AR character image and information indicating the feature of the predetermined subject.

3. The individual identification character display system according to claim 2, further comprising:
an AR database server on a network that retains the individual record in which the information regarding each registered individual user is recorded,
wherein breakdowns of the individual record of each registered individual user include information defining a shape of the AR character image and information indicating the feature of the predetermined subject.

4. The individual identification character display system according to claim 3, wherein the information regarding the individual record of each registered individual user retained by each of the terminal device and the second terminal device used by the second registered user is exchanged to be referred to between the terminal device and the second terminal device by an indirect communication unit through which the AR database server performs relay via the network.

5. The individual identification character display system according to claim 3, wherein information regarding the individual record of each registered individual user retained by the AR database server is downloaded to the terminal device and the second terminal device to be referred to by the terminal device and the second terminal device.

6. The individual identification character display system according to claim 5, wherein position information regarding a current position of the terminal device owned by the registered individual user is able to be registered in the AR database server on the network, and the position information is transmitted to the terminal device when downloaded from the AR database server and is reflected in display of the image of the real world including the combined image region.

7. The individual identification character display system according to claim 2, wherein the AR database server on the network is caused to determine whether there is the terminal device of the second registered user of which a current position is included in an imaging range of the camera and there is information regarding the individual record of each registered individual user registered from the terminal device of the second registered user.

8. A terminal device that combines a CG-drawn image with an image of the real world photographed by a camera mounted on the own terminal device, the terminal device comprising:
a detection unit that recognizes and detects, from image data of the real world photographed by the camera, a partial region having a feature of a predetermined subject in an image region displaying the image data by a pattern matching method;
a drawing combination unit that combines a predetermined CG image retained in advance corresponding to the subject featured in the partial region with the detected partial region of the image of the real world, the predetermined CG image identifying a specific individual;
an image display unit that displays the image of the real world including the combined image region; and
a direct proximity communication unit configured to directly exchange information, including at least the feature of the predetermined subject, regarding the individual record of each registered individual user retained by each of the terminal device and a second terminal device used by the second registered user to be referred between the terminal device and the second terminal device,
wherein the drawing combination unit provides an animation in which a graphic associated with a feature numerical value of a face of the subject is flying in the vicinity of a region of the face by changing a relative position of the graphic using time as a key.

9. An individual identification character display method of combining a CG-drawn image with an image of the real world photographed by a camera mounted on a terminal device, the individual identification character display method comprising:
recognizing and detecting, from image data of the real world photographed by the camera, a partial region having a feature of a predetermined subject in an image region displaying the image data by a pattern matching method;
combining a predetermined CG image retained in advance corresponding to the subject featured in the partial region with the detected partial region of the image of the real world, the predetermined CG image identifying a specific individual;
displaying the image of the real world including the combined image region; and
directly exchanging information, including at least the feature of the predetermined subject, regarding the individual record of each registered individual user retained by each of the terminal device and a second terminal device used by the second registered user to be referred between the terminal device and the second terminal device,
wherein the step of displaying comprises providing an animation in which a graphic associated with a feature numerical value of a face of the subject is flying in the vicinity of a region of the face by changing a relative position of the graphic using time as a key.

10. A non-transitory computer readable recording medium storing computer program instructions that, when executed by a processor, cause the processor to control a terminal device that combines a CG-drawn image with an image of the real world photographed by a mounted camera, the computer program instructions cause the processor to perform a method, comprising:
recognizing and detecting, from image data of the real world photographed by the camera, a partial region having a feature of a predetermined subject in an image region displaying the image data by a pattern matching method;
combining a predetermined CG image retained in advance corresponding to the subject featured in the partial region with the detected partial region of the image of the real world, the predetermined CG image identifying a specific individual;

displaying the image of the real world including the combined image region; and directly exchanging information, including at least the feature of the predetermined subject, regarding the individual record of each registered individual user retained by each of the terminal device and a second terminal device used by the second registered user to be referred between the terminal device and the second terminal device, wherein the step of displaying comprises providing an animation in which a graphic associated with a feature numerical value of a face of the subject is flying in the vicinity of a region of the face by changing a relative position of the graphic using time as a key.

* * * * *